US012625899B2

(12) United States Patent
Higashi et al.

(10) Patent No.: US 12,625,899 B2
(45) Date of Patent: *May 12, 2026

(54) DOCUMENT SEARCH SYSTEM AND DOCUMENT SEARCH METHOD

(71) Applicant: Semiconductor Energy Laboratory Co., Ltd., Atsugi (JP)

(72) Inventors: Kazuki Higashi, Atsugi (JP); Junpei Momo, Sagamihara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,826

(22) Filed: Aug. 16, 2024

(65) Prior Publication Data

US 2024/0403351 A1 Dec. 5, 2024

Related U.S. Application Data

(63) Continuation of application No. 17/600,280, filed as application No. PCT/IB2020/053578 on Apr. 16, 2020, now Pat. No. 12,099,543.

(30) Foreign Application Priority Data

Apr. 26, 2019 (JP) ................................ 2019-084820

(51) Int. Cl.
*G06F 16/36* (2019.01)
*G06F 40/242* (2020.01)
(Continued)

(52) U.S. Cl.
CPC .......... *G06F 16/374* (2019.01); *G06F 40/242* (2020.01); *G06F 40/247* (2020.01); *G06F 40/279* (2020.01)

(58) Field of Classification Search
CPC .... G06F 16/245; G06F 16/2379; G06F 16/43; G06F 16/953; G06F 16/313;
(Continued)

(56) References Cited

U.S. PATENT DOCUMENTS

| | | | |
|---|---|---|---|
| 8,407,232 B2 | 3/2013 | Nozaki | |
| 10,747,758 B2 * | 8/2020 | Gupta ................... | G06F 16/243 |

(Continued)

FOREIGN PATENT DOCUMENTS

| | | |
|---|---|---|
| EP | 2315135 A | 4/2011 |
| JP | 05-342255 A | 12/1993 |

(Continued)

OTHER PUBLICATIONS

International Search Report (Application No. PCT/IB2020/053578) Dated Aug. 4, 2020.

(Continued)

*Primary Examiner* — Hung T Vy
(74) *Attorney, Agent, or Firm* — Eric J. Robinson; Robinson Intellectual Property Law Office, P.C.

(57) ABSTRACT

Highly accurate document search, especially intellectual property-related document search, is achieved with a simple input method. A processing portion has a function of generating text analysis data from text data input to an input portion; a function of extracting a search word from words included in the text analysis data; and a function of generating first search data from the search word on the basis of weight dictionary data and thesaurus data. A memory portion stores second search data generated when the first search data is modified by a user. The processing portion updates the thesaurus data in accordance with the second search data.

9 Claims, 17 Drawing Sheets

(51) Int. Cl.
 *G06F 40/247* (2020.01)
 *G06F 40/279* (2020.01)

(58) Field of Classification Search
 CPC ............. G06F 16/3334; G06F 16/3344; G06F 40/242; G06F 40/247; G06F 8/65
 USPC ............................................... 707/769; 704/9
 See application file for complete search history.

(56) References Cited

U.S. PATENT DOCUMENTS

| | | | |
|---|---|---|---|
| 2009/0313233 A1 | 12/2009 | Hanazawa | |
| 2011/0063339 A1 | 3/2011 | Umezaki et al. | |
| 2013/0289977 A1* | 10/2013 | Tanaka | G06F 21/6254 |
| | | | 704/9 |
| 2014/0201126 A1* | 7/2014 | Zadeh | A61B 5/165 |
| | | | 706/52 |
| 2016/0293232 A1 | 10/2016 | Ishizu et al. | |
| 2016/0343452 A1 | 11/2016 | Ikeda et al. | |
| 2017/0116512 A1 | 4/2017 | Kurokawa | |
| 2017/0118479 A1 | 4/2017 | Kurokawa | |
| 2017/0317085 A1 | 11/2017 | Kurokawa | |
| 2018/0005566 A1 | 1/2018 | Kurokawa | |
| 2018/0101553 A1 | 4/2018 | Nakamura et al. | |
| 2019/0005035 A1 | 1/2019 | Yamazaki et al. | |
| 2019/0205382 A1* | 7/2019 | Raux | G06F 40/30 |
| 2019/0348011 A1 | 11/2019 | Kurokawa | |
| 2019/0362683 A1 | 11/2019 | Ikeda et al. | |
| 2019/0371226 A1 | 12/2019 | Iwaki | |
| 2020/0160158 A1 | 5/2020 | Okamoto et al. | |
| 2020/0194527 A1 | 6/2020 | Kawashima et al. | |
| 2020/0201603 A1 | 6/2020 | Kozuma et al. | |
| 2020/0219467 A1 | 7/2020 | Okamoto | |
| 2020/0242730 A1 | 7/2020 | Shiokawa et al. | |
| 2020/0278398 A1 | 9/2020 | Isa et al. | |
| 2020/0382730 A1 | 12/2020 | Kurokawa et al. | |
| 2020/0409963 A1 | 12/2020 | Higashi et al. | |
| 2021/0011956 A1 | 1/2021 | Yamazaki et al. | |
| 2021/0055352 A1 | 2/2021 | Takahashi et al. | |
| 2021/0257681 A1 | 8/2021 | Takahashi et al. | |
| 2021/0318856 A1 | 10/2021 | Ikeda et al. | |

FOREIGN PATENT DOCUMENTS

| | | |
|---|---|---|
| JP | 11-143892 A | 5/1999 |
| JP | 2002-288215 A | 10/2002 |
| JP | 2008-070921 A | 3/2008 |
| JP | 2010-003015 A | 1/2010 |
| JP | 2011-090463 A | 5/2011 |
| JP | 2013-232090 A | 11/2013 |
| JP | 2015-164008 A | 9/2015 |
| JP | 2018-060463 A | 4/2018 |
| JP | 2018-206376 A | 12/2018 |
| JP | 2019-046019 A | 3/2019 |
| WO | WO-2007/060780 | 5/2007 |

OTHER PUBLICATIONS

Written Opinion (Application No. PCT/IB2020/053578) Dated Aug. 4, 2020.
Word2vec, https://github.com/imsky/word2vec, Jan. 31, 2015.
Nakayama.Y, "Feature extraction and TF-IDF", https://qiita.com/ynakayama/items/300460aa718363abc85c, Jun. 23, 2014.

* cited by examiner

S12

Start

Input document data TD$_{REF}$

S41

Word segmentation processing

S42

Morphological analysis

S43

Generate text analysis data AD$_{REF}$

S44

Generate IDF data ID

S45

Generate weight dictionary data

S46

End

S15

Start

Input text data TD
S31

Word segmentation processing
S32

Morphological analysis
S33

Generate text analysis data AD
S34

Generate IDF data ID
S35

Extract search word
S36

End

FIG. 6A
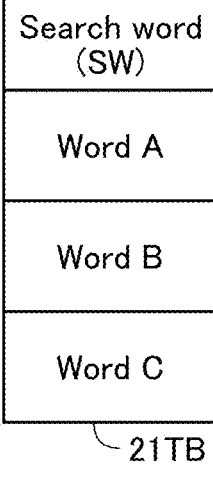
| Search word (SW) |
| --- |
| Word A |
| Word B |
| Word C |
21TB
FIG. 6B
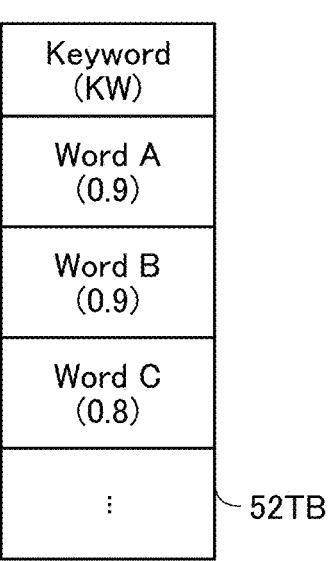
| Keyword (KW) |
| --- |
| Word A (0.9) |
| Word B (0.9) |
| Word C (0.8) |
| ⋮ |
52TB
FIG. 6C
| Keyword KW | Related term RW | | | |
| --- | --- | --- | --- | --- |
| Word A | Word X (0.9) | Word Y (0.8) | Word Z (0.6) | Word a (0.5) |
| Word B | Word b (0.5) | Word c (0.5) | Word d (0.45) | Word e (0.3) |
| Word C | Word f (0.75) | Word g (0.75) | Word h (0.75) | Word i (0.75) |
| Word D | Word j (0.5) | Word k (0.3) | Word m (0.3) | Word n (0.1) |
| Word E | Word p (0.75) | Word q (0.65) | Word r (0.65) | Word s (0.6) |
| ⋮ | ⋮ | ⋮ | ⋮ | ⋮ |
53TB

FIG. 7

| Keyword KW | Related term RW | | | |
|---|---|---|---|---|
| Word A (0.9) | Word X (0.9) | Word Y (0.8) | Word Z (0.6) | Word a (0.5) |
| Word B (0.9) | Word b (0.5) | Word c (0.5) | Word d (0.45) | Word e (0.3) |
| Word C (0.8) | Word f (0.75) | Word g (0.75) | Word h (0.75) | Word i (0.75) |

| Keyword KW | Related term RW | | | |
|---|---|---|---|---|
| Word A (0.9) | Word X (0.9) | Word Y (0.8) | Word Z (0.6) | Word a (0.5) |
| Word B (0.9) | Word b (0.5) | Word c (0.5) | Word d (0.45) | Word e (0.3) |
| Word C (0.8) | Word f (0.75) | Word g (0.75) | Word h (0.75) | Word i (0.75) |

61TB

⬇

| Keyword KW | Related term RW | | | |
|---|---|---|---|---|
| Word A (0.9) | Word X (0.9) | Word Y (0.8) | Word Z (0.6) | Word a (1.0) |
| Word B (0.9) | Word b (0.5) | Word c (0.0) | Word d (0.45) | Word e (0.3) |
| Word C (0.8) | Word f (0.75) | Word g (0.75) | Word h (1.0) | Word i (0.75) |

| Keyword KW | Related term RW | | | |
|---|---|---|---|---|
| Word A | Word X (0.9) | Word Y (0.8) | Word Z (0.6) | Word a (0.5) |
| Word B | Word b (0.5) | Word c (0.5) | Word d (0.45) | Word e (0.3) |
| Word C | Word f (0.75) | Word g (0.75) | Word h (0.75) | Word i (0.75) |
| Word D | Word b (0.5) | Word c (0.5) | Word d (0.45) | Word e (0.3) |
| Word E | Word f (0.75) | Word g (0.75) | Word h (0.75) | Word i (0.75) |
| ⋮ | ⋮ | ⋮ | ⋮ | ⋮ |

53TB

| Keyword KW | Related term RW | | | |
|---|---|---|---|---|
| Word A | Word a (1.0) | Word X (0.9) | Word Y (0.8) | Word Z (0.6) |
| Word B | Word b (0.5) | Word d (0.45) | Word e (0.3) | Word c (0.0) |
| Word C | Word h (1.0) | Word f (0.75) | Word g (0.75) | Word i (0.75) |
| Word D | Word b (0.5) | Word c (0.5) | Word d (0.45) | Word e (0.3) |
| Word E | Word f (0.75) | Word g (0.75) | Word h (0.75) | Word i (0.75) |
| ⋮ | ⋮ | ⋮ | ⋮ | ⋮ |

53TB_re

S22

S19

S73

$$a=x_1w_1+x_2w_2+b$$

DOCUMENT SEARCH SYSTEM AND DOCUMENT SEARCH METHOD

TECHNICAL FIELD

One embodiment of the present invention relates to a document search system and a document search method.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a driving method thereof, and a manufacturing method thereof.

BACKGROUND ART

Prior art search before application for an invention can reveal if there is a relevant intellectual property right. Domestic or foreign patent documents, papers, and the like obtained through the prior art search are helpful in confirming the novelty and non-obviousness of the invention and determining whether to file the application. In addition, patent invalidity search can reveal whether there is a possibility of invalidation of the patent right owned by an applicant or whether the patent rights owned by others can be rendered invalid.

When a user enters a keyword into a patent document search system, the system will output patent documents containing the keyword, for example.

To conduct highly accurate prior art search with such a system, a user needs to have good techniques; for example, a user should select a proper search keyword and have to pick up needed patent documents from many patent documents output by the system.

Use of artificial intelligence is under consideration for various applications. In particular, artificial neural networks are expected to provide computers having higher performance than conventional von Neumann computers. In recent years, a variety of studies on creation of artificial neural networks with electronic circuits have been carried out.

For example, Patent Document 1 discloses an invention in which weight data necessary for calculation with an artificial neural network is retained in a memory device including a transistor that includes an oxide semiconductor in its channel formation region.

REFERENCE

Patent Document

[Patent Document 1] United States Patent Application Publication No. 2016/0343452

SUMMARY OF THE INVENTION

Problems to be Solved by the Invention

An object of one embodiment of the present invention is to provide a document search system that enables highly accurate document search. Alternatively, an object of one embodiment of the present invention is to provide a document search method that enables highly accurate document search. Alternatively, an object of one embodiment of the present invention is to achieve highly accurate document search, especially for a document relating to intellectual property, with an easy input method.

The description of a plurality of objects does not disturb the existence of each object. One embodiment of the present invention does not necessarily achieve all the objects described as examples. Furthermore, objects other than those listed are apparent from description of this specification, and such objects can be objects of one embodiment of the present invention.

Means for Solving the Problems

One embodiment of the present invention is a document search system including an input portion, a database, a memory portion, and a processing portion. The database has a function of storing a plurality of pieces of reference document data, weight dictionary data, and thesaurus data. The processing portion has a function of generating the weight dictionary data and the thesaurus data on the basis of the reference document data; a function of generating text analysis data from text data input to the input portion; a function of extracting a search word from words included in the text analysis data; and a function of generating first search data from the search word on the basis of the weight dictionary data and the thesaurus data. The memory portion has a function of storing second search data generated when the first search data is modified by a user. The processing portion has a function of updating the thesaurus data in accordance with the second search data.

In one embodiment of the present invention, the document search system is preferable in which the processing portion has a function of generating reference text analysis data from the reference document data; and a function of extracting a plurality of keywords and related terms of the keywords from words included in the reference text analysis data.

In one embodiment of the present invention, the document search system is preferable in which the weight dictionary data is data generated by extracting appearance frequencies of the keywords from the words included in the reference text analysis data and adding, to each of the keywords, a first weight based on the appearance frequency.

In one embodiment of the present invention, the document search system is preferable in which the first weight is a value based on an inverse document frequency of the keyword in the reference text analysis data.

In one embodiment of the present invention, the document search system is preferable in which the thesaurus data is data generated by adding a second weight to each of the related terms.

In one embodiment of the present invention, the document search system is preferable in which the second weight is a product of the first weight of the keyword and a value based on the similarity degree or the distance between a distributed representation vector of the related term and a distributed representation vector of the keyword.

In one embodiment of the present invention, the document search system is preferable in which the distributed representation vector is a vector generated with use of a neural network.

In one embodiment of the present invention, the document search system is preferable in which the processing portion includes a transistor and the transistor includes a metal oxide in its channel formation region.

In one embodiment of the present invention, the document search system is preferable in which the processing portion includes a transistor and the transistor includes silicon in its channel formation region.

One embodiment of the present invention is a document search method including the steps of generating weight dictionary data and thesaurus data on the basis of a plurality of pieces of reference document data; generating text analysis data from text data; extracting a search word from words included in the text analysis data; generating first search data from the search word on the basis of the weight dictionary data and the thesaurus data; updating the thesaurus data in accordance with second search data generated when the first search data is modified by a user; and generating ranking data by giving scores to the plurality of pieces of reference document data on the basis of the second search data and ranking the plurality of pieces of reference document data on the basis of the scores.

In one embodiment of the present invention, the document search method is preferable in which reference text analysis data is generated from the reference document data and a plurality of keywords and related terms of the keywords are extracted from words included in the reference text analysis data.

In one embodiment of the present invention, the document search method is preferable in which the weight dictionary data is data generated by extracting appearance frequencies of the keywords from the words included in the reference text analysis data and adding, to each of the plurality of keywords, a first weight based on the appearance frequency.

In one embodiment of the present invention, the document search method is preferable in which the first weight is a value based on an inverse document frequency of the keyword in the reference text analysis data.

In one embodiment of the present invention, the document search method is preferable in which the thesaurus data is data generated by adding a second weight to each of the related terms.

In one embodiment of the present invention, the document search method is preferable in which the second weight is a product of the first weight of the keyword and a value based on the similarity degree or the distance between a distributed representation vector of the related term and a distributed representation vector of the keyword.

In one embodiment of the present invention, the document search method is preferable in which the distributed representation vector is a vector generated with use of a neural network.

Note that other embodiments of the present invention will be shown in the description of the following embodiments and the drawings.

Effect of the Invention

According to one embodiment of the present invention, a document search system that enables highly accurate document search can be provided. Alternatively, according to one embodiment of the present invention, a document search method that enables highly accurate document search can be provided. Alternatively, according to one embodiment of the present invention, highly accurate document search, especially for a document relating to intellectual property, can be achieved with an easy input method.

The description of a plurality of effects does not disturb the existence of other effects. One embodiment of the present invention does not necessarily achieve all the effects described as examples. In one embodiment of the present invention, other objects, effects, and novel features will be apparent from the description of this specification and the drawings.

BRIEF DESCRIPTION OF THE DRAWINGS

FIG. 6A to FIG. 6C are schematic views showing a document search method.

FIG. 7 is a schematic view showing a document search method.

FIG. 8 is a schematic view showing a document search method.

FIG. 9 is a schematic view showing a document search method.

MODE FOR CARRYING OUT THE INVENTION

Figure 1:
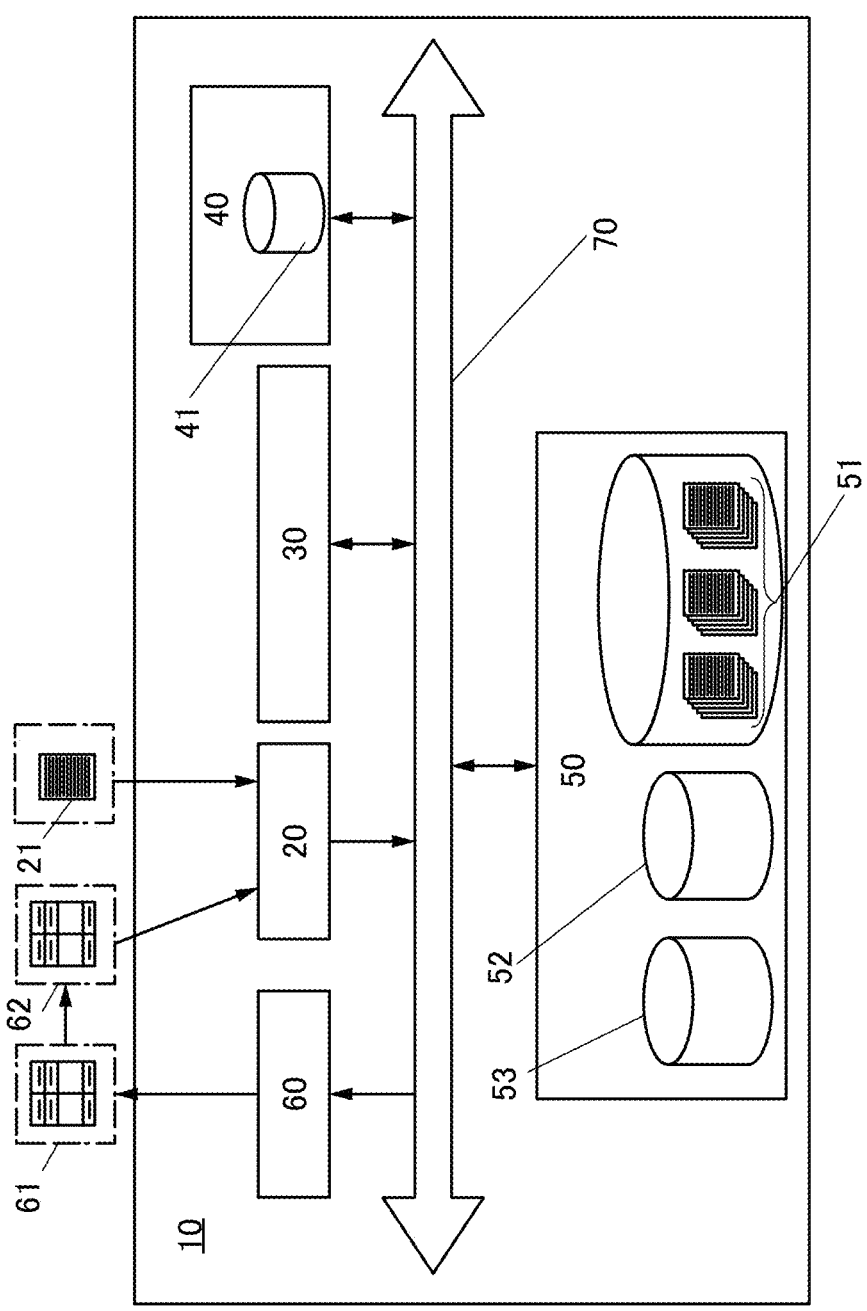
FIG. 1 is a block diagram showing an example of a document search system.

Embodiments of the present invention will be described below. Note that one embodiment of the present invention is not limited to the following description, and it will be readily appreciated by those skilled in the art that modes and details of the present invention can be modified in various ways without departing from the spirit and scope of the present invention. One embodiment of the present invention therefore should not be construed as being limited to the following description of the embodiments.

Note that ordinal numbers such as "first", "second", and "third" in this specification and the like are used in order to avoid confusion among components. Thus, the terms do not limit the number of components. In addition, the terms do not limit the order of components. Furthermore, in this specification and the like, for example, a "first" component in one embodiment can be referred to as a "second" component in other embodiments or claims. Furthermore, in this specification and the like, for example, a "first" component in one embodiment can be omitted in other embodiments or claims.

The same components, components having similar functions, components made of the same material, components formed at the same time, and the like in the drawings are denoted by the same reference numerals, and repetitive description thereof is skipped in some cases.

In this specification, a power supply potential VDD may be abbreviated to a potential VDD, VDD, or the like, for example. The same applies to other components (e.g., a signal, a voltage, a circuit, an element, an electrode, a wiring, and the like).

Moreover, when a plurality of components are denoted by the same reference numerals, and, in particular, need to be distinguished from each other, an identification sign such as "_1", "_2", "[n]", or "[m,n]" is sometimes added to the reference numerals. For example, a second wiring GL is referred to as a wiring GL[2].

Embodiment 1

In this embodiment, a document search system and a document search method of one embodiment of the present invention will be described with reference to FIG. 1 to FIG. 12.

In this embodiment, a document search system that be used for a search for intellectual property is described as an example of the document search system. Note that not being limited to use for a search for intellectual property, the document search system of one embodiment of the present invention can be used for other searches than intellectual property.

FIG. 1 shows a block diagram of a document search system 10. The document search system 10 includes an input portion 20, a processing portion 30, a memory portion 40, a database 50, an output portion 60, and a transmission path 70.

Data (e.g., text data 21) is supplied to the input portion 20 from the outside of the document search system 10. In addition, to the input portion is supplied modified data (e.g., search data 62) that is generated when a user using the document search system modifies data (e.g., search data 61) output from the output portion 60. The text data 21 and the search data 62 are supplied to the processing portion 30, the memory portion 40, or the database 50 through the transmission path 70.

Note that in this specification and the like, data of a document relating to intellectual property is referred to as document data. The text data is data corresponding to part of the document data. Specific examples of the document data include data of publications such as a patent document (e.g., published application publication, and a patent publication), a utility model publication, a design publication, and a paper. Not only publications issued domestically but also those issued in foreign countries can be used as the intellectual property-related document data. Note that the document data corresponds to data that is referred to for text data including text to be searched. Thus, the document data is sometimes referred to as reference document data.

The text data 21 is data that is part of the reference document data. Specifically, each of the specification, claims, and abstract of a patent document can be partly or wholly used as the text data 21. For example, an embodiment for carrying out a certain invention, an example, or a claim can be used as the text data 21. Similarly, text in another kind of publication such as a paper can be partly or wholly used as the text data 21.

The document relating to intellectual property is not limited to publications. For example, text files owned by a user or a user group of the document search system can be used as the text data 21.

Furthermore, examples of the document relating to intellectual property include sentences describing inventions, devices, industrial design or industrial products.

The text data 21 can include, for example, patent documents of a certain applicant or patent documents in a certain technical field.

The text data 21 can include not only the description of an intellectual property itself (e.g., the specifications) but also various kinds of information relating to the intellectual property (e.g., bibliographic information). As the information, for example, the applicant, technical field, application number, publication number, current status (pending, patented, abandoned, or the like), or the like can be included.

The text data 21 preferably includes the date information of an intellectual property. In the case where the intellectual property is in the form of a patent document, the date information can include, for example, the filing date, publication date, issue date, or the like; in the case where the intellectual property is technical information on an industrial product, the date information can include, for example, the launch date.

In this way, the text data 21 can include various kinds of information on intellectual properties, so that various search scopes are selectable in the document search system.

The processing portion 30 has a function of performing calculation, inference, or the like with use of the data supplied from the input portion 20, the memory portion 40, the database 50, or the like. The processing portion 30 can supply a calculation result, an inference result, or the like to the memory portion 40, the database 50, the output portion 60, or the like.

A transistor whose channel formation region includes a metal oxide is preferably used in the processing portion 30. The transistor has an extremely low off-state current; therefore, with use of the transistor as a switch for retaining electric charge (data) which flows into a capacitor functioning as a memory element, a long data retention period can be ensured. When at least one of a register and a cache memory included in the processing portion 30 has such a feature, the processing portion 30 can be operated only when needed, and otherwise can be off while information processed immediately before turning off the processing portion 30 is stored in the memory element; accordingly, normally-off computing is possible and the power consumption of the document search system can be reduced.

In this specification and the like, a transistor including an oxide semiconductor or a metal oxide in its channel formation region is referred to as an oxide semiconductor transistor or an OS transistor. A channel formation region of an OS transistor preferably includes a metal oxide.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is to say, in the case where a metal oxide has at least one of an amplifying function, a rectifying function, and a switching function, the metal oxide can be called a metal oxide semiconductor, or OS for short.

The metal oxide included in the channel formation region preferably contains indium (In). When the metal oxide included in the channel formation region is a metal oxide containing indium, the carrier mobility (electron mobility) of the OS transistor increases. The metal oxide included in the channel formation region is preferably an oxide semiconductor containing an element M. The element M is preferably aluminum (Al), gallium (Ga), tin (Sn), or the like.

Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that it is sometimes acceptable to use a plurality of the above-described elements in combination as the element M. The element M is an element having high bonding energy with oxygen, for example. The element M is an element having higher bonding energy with oxygen than indium, for example. The metal oxide included in the channel formation region is preferably a metal oxide containing zinc (Zn). The metal oxide containing zinc is easily crystallized in some cases.

The metal oxide included in the channel formation region is not limited to the metal oxide containing indium. The semiconductor layer may be a metal oxide that does not contain indium and contains zinc, a metal oxide that does not contain indium and contains gallium, a metal oxide that does not contain indium and contains tin, or the like, e.g., zinc tin oxide or gallium tin oxide.

Furthermore, a transistor including silicon in its channel formation region may be used in the processing portion 30.

In the processing portion 30, a transistor including an oxide semiconductor in its channel formation region and a transistor including silicon in its channel formation region are preferably used in combination.

The processing portion 30 includes, for example, an arithmetic circuit, a central processing unit (CPU), or the like.

The processing portion 30 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing portion 30 can interpret and execute instructions from various programs with use of a processor to process various kinds of data and control programs. The programs to be executed by the processor are stored in at least one of a memory region of the processor and the memory portion 40.

The processing portion 30 may include a main memory. The main memory includes at least one of a volatile memory such as a RAM (Random Access Memory) and a nonvolatile memory such as a ROM (Read Only Memory).

For example, a DRAM (Dynamic Random Access Memory), an SRAM (Static Random Access Memory), or the like is used as the RAM, and a memory space is virtually assigned as a work space for the processing portion 30 and used. An operating system, an application program, a program module, program data, a look-up table, and the like which are stored in the memory portion 40 are loaded into the RAM for execution. The data, program, and program module which are loaded into the RAM are each directly accessed and operated by the processing portion 30.

In the ROM, a BIOS (Basic Input/Output System), firmware, and the like for which rewriting is not needed can be stored. As examples of the ROM, a mask ROM, an OTPROM (One Time Programmable Read Only Memory), an EPROM (Erasable Programmable Read Only Memory), and the like can be given. As the EPROM, a UV-EPROM (Ultra-Violet Erasable Programmable Read Only Memory) which can erase stored data by ultraviolet irradiation, an EEPROM (Electrically Erasable Programmable Read Only Memory), a flash memory, and the like can be given.

The memory portion 40 has a function of storing a program to be executed by the processing portion 30. The memory portion 40 may have a function of storing a calculation result and an inference result generated by the processing portion 30, data input to the input portion 20, and the like. The memory portion 40 has a function of storing the search data 62 input to the input portion 20 as search data 41 in the memory portion 40. The search data 41 stored in the memory portion 40 is used to update thesaurus data to be described later.

The memory portion 40 includes at least one of a volatile memory and a nonvolatile memory. For example, the memory portion 40 may include a volatile memory such as a DRAM or an SRAM. For example, the memory portion 40 may include a nonvolatile memory such as an ReRAM (Resistive Random Access Memory), a PRAM (Phase change Random Access Memory), an FeRAM (Ferroelectric Random Access Memory), a MRAM (Magnetoresistive Random Access Memory), or a flash memory. The memory portion 40 may include a storage media drive such as a hard disc drive (HDD) or a solid state drive (SSD).

The database 50 has a function of storing at least reference document data 51 to be searched, weight dictionary data 52, and synonym search data 53. The database 50 may have a function of storing a calculation result and an inference result generated by the processing portion 30, data input to the input portion 20, and the like. Note that the memory portion 40 and the database 50 are not necessarily separated from each other. For example, the document search system 10 may include a storage unit that has both the functions of the memory portion 40 and the database 50.

The reference document data 51 is a plurality of pieces of document data relating to intellectual property. The weight dictionary data 52 is data generated in the following manner: the appearance frequencies of a plurality of keywords are extracted from words included in reference text analysis data obtained by analyzing the reference document data 51; and a weight based on the appearance frequency is added to each of the plurality of keywords. The synonym search data 53 is data generated in the following manner: related terms of the keywords are extracted from the words included in the reference text analysis data; and a weight based on the similarity degree is added to each of the related terms.

The database 50 has a function of storing an inverse document frequency (hereinafter, referred to as IDF) data (hereinafter, referred to as IDF data) needed for generation of the weight dictionary data 52 and the synonym search data 53. The IDF indicates a low frequency in which one word appears in a document. The IDF of a word that appears in many documents is low, and the IDF of a word that appears only in a few documents is high. Thus, a word with a high IDF can be regarded as a characteristic word in the reference text analysis data. The IDF data is preferably used for calculation of the appearance frequencies of the keywords.

Note that a search word can be extracted from text data on the basis of the IDF. For example, a word whose IDF is higher than or equal to a certain value may be extracted as a search word, or a given number of words that are listed in a descending order of IDF can be extracted as search words.

The database 50 has a function of storing vector data needed for calculation of a related term of a keyword. The related term is extracted from the words included in the reference text analysis data on the basis of the similarity degree or the proximity of the distance between distributed representation vectors of the words and a distributed representation vector of the keyword. It is preferable to use, in calculation of the weight of the related term, a product of the weight of the keyword and a value based on the similarity degree or the distance between a distributed representation vector of the related term and the distributed representation vector of the keyword. Alternatively, a value based on the similarity degree or the distance between the distributed representation vector of the related term and the distributed representation vector of the keyword may be used in calculation of the weight of the related term. The weight of the related term is set on the basis of both the similarity degree between the related term and the keyword and the weight of the keyword itself, whereby the searching accuracy can be enhanced. Examples of related terms include synonyms, antonyms, broader terms, and narrower terms.

Note that the search data 61 corresponds to data generated by extracting a search word included in the text data 21 and referring to the thesaurus data and the weight dictionary data. The search data is data in which weights are added to both the keyword corresponding to the search word and the related term of the keyword. When each of the keyword and the related term has a weight, the reference text data where the keyword or the related term gets a hit can be scored on the basis of the weight. The search data 62 corresponds to data obtained when the weight in the search data 61 is modified by user's operation.

The output portion 60 has a function of supplying search data to the outside of the document search system 10. For example, search data generated in the processing portion 30 can be supplied to a display device or the like provided outside the document search system 10. The user can confirm the generated search data with use of a display device or the like provided outside the document search system 10.

The transmission path 70 has a function of transmitting data. The data transmission and reception among the input portion 20, the processing portion 30, the memory portion 40, the database 50, and the output portion 60 can be performed through the transmission path 70.

Figure 2:
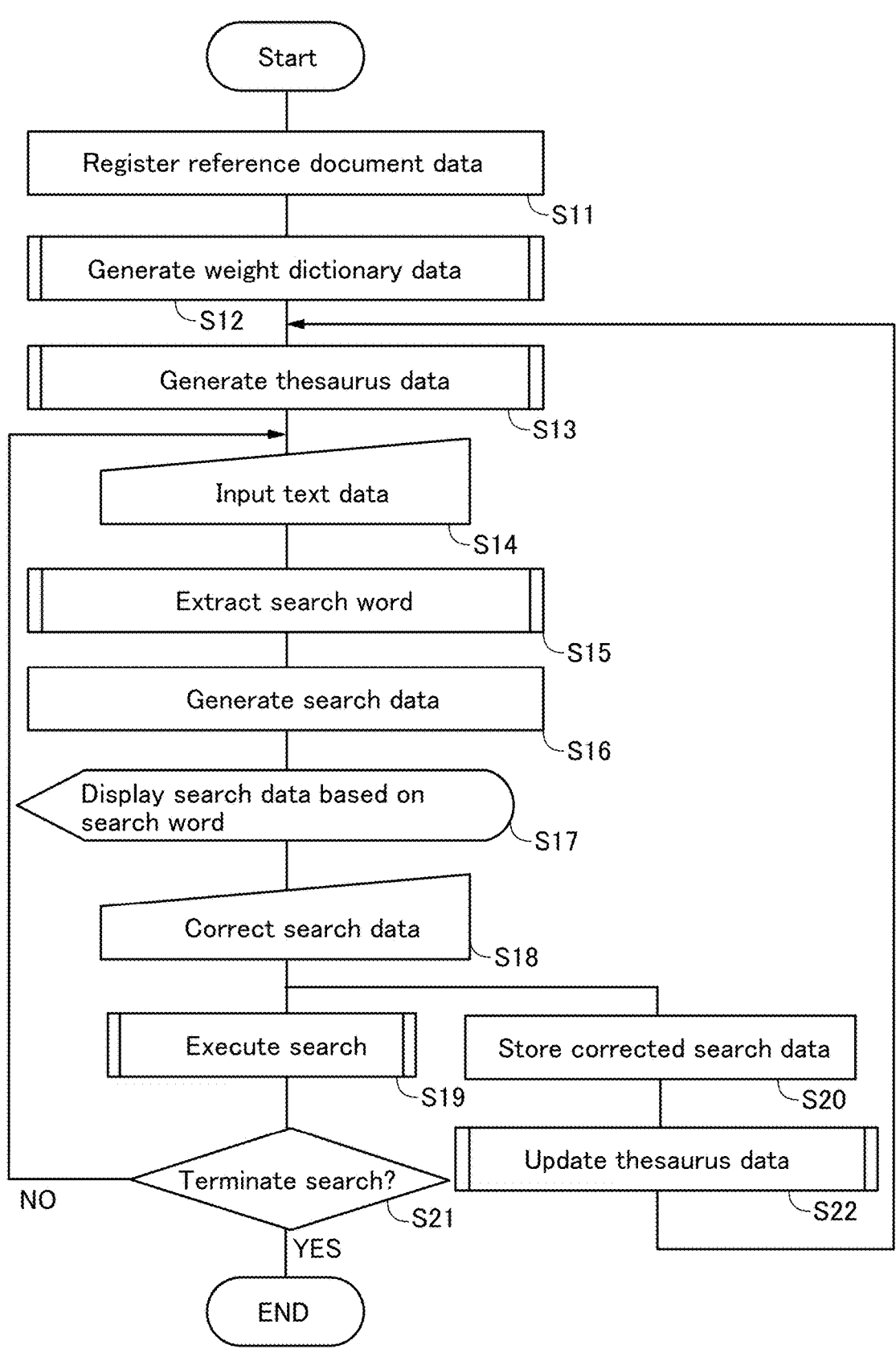
FIG. 2 is a flow chart showing a document search method.

FIG. 2 is a flow chart showing a document search method using the document search system 10 illustrated in FIG. 1.

In the flow chart shown in FIG. 2, first, reference text data is registered in the database 50 (Step S11). The step of registration may be performed in the following steps.

Next, weight dictionary data is generated (Step S12). The sequence of generating the weight dictionary data in Step S12 is described later with reference to FIG. 3.

Next, thesaurus data is generated (Step S13). The sequence of generating the thesaurus data in Step S13 is described later with reference to FIG. 4. Note that Step S13 may be performed before or performed concurrently with Step S12.

Next, text data is input (Step S14). The text data is input through a graphical user interface (GUI) such as a display device provided outside the document search system 10.

Next, a search word is extracted from the text data (Step S15). The sequence of extracting the search word in Step S15 is described later with reference to FIG. 5.

Next, search data is generated (Step S16). The search data is generated with reference to the search word, the weight dictionary data, and the thesaurus data. The search data in Step S16 is described later with reference to FIG. 7 and the like.

Next, the search data is displayed on the basis of the search data (Step S17). The search data is displayed by outputting the search data to the GUI such as a display device provided outside the document search system 10.

Next, the search data displayed in Step S17 is modified (Step S18). This modification is performed in such a manner that the user modifies a value of weight data of the search data displayed on a display device provided outside the document search system 10.

Next, a search is executed on the basis of the modified search data (Step S19). The sequence of the search execution in Step S19 is described later with reference to FIG. 11.

The search data modified in Step S18 is stored in the memory portion or the like (Step S20).

After the search is executed in Step S19, whether the search is terminated or not is determined (Step S21). In the case where the search is continued, the processing returns to Step S14 and text data is input again. In the case where the search is terminated, the search is completed.

After the modified search data is stored in Step S20, the thesaurus data is updated (Step S22). That is, the data generated in Step S13 of generating the thesaurus data is updated. The sequence of updating the thesaurus data in Step S22 is described later with reference to FIG. 10 and the like.

According to the flow chart of FIG. 2, in the document search method of one embodiment of the present invention, the thesaurus data can be updated with use of the search data modified by the user. Thus, a document search method that enables highly accurate document search can be provided. Alternatively, highly accurate document search, especially intellectual property-related document search, can be achieved with an easy input method.

Figure 3:
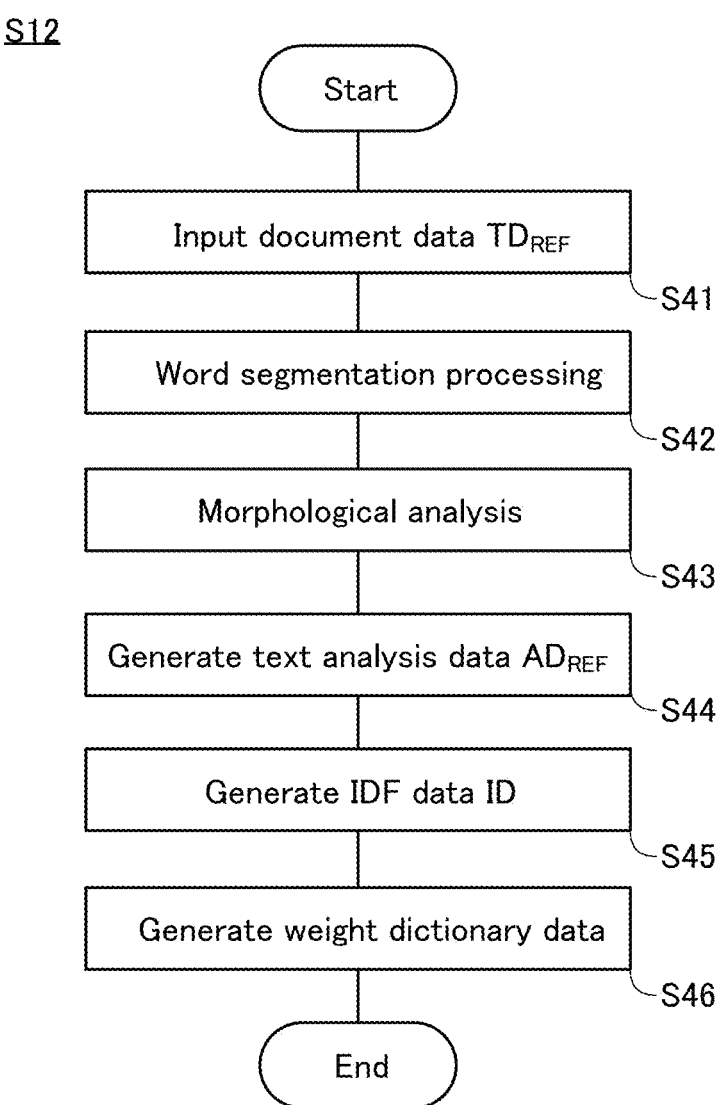
FIG. 3 is a flow chart showing a document search method.

FIG. 3 is a flow chart of Step S12 shown in FIG. 2, in which the weight dictionary data is generated.

First, a plurality of pieces of reference document data (hereinafter, document data $TD_{REF}$) are input to the processing portion 30 through the input portion 20 (Step S41). Step S41 corresponds to Step S11 described above.

Next, word segmentation processing is performed on the document data $TD_{REF}$ (Step S42). After that, processing for modifying inappropriate word segmentation processing is preferably performed.

Next, morphological analysis is performed on the document data $TD_{REF}$ subjected to the word segmentation processing (Step S43).

Next, text analysis data $AD_{REF}$ (reference text analysis data) of the data subjected to the morphological analysis is generated (Step S44). In the morphological analysis, text written in a natural language is divided into morphemes (smallest meaningful units in a language), and parts of speech in the morphemes can be distinguished, for example. Thus, only nouns can be extracted from the document data $TD_{REF}$ subjected to the word segmentation processing to generate the text analysis data $AD_{REF}$, for example.

Next, IDFs of the words included in the text analysis data $AD_{REF}$ are calculated, so that IDF data ID is generated (Step S45). The IDF data ID includes words (Word) and the normalized IDFs. The IDF data ID includes a word (Word) that is a keyword and the normalized IDF.

IDF(t) of a certain word t can be calculated by normalizing idf(t) of Formula (1). There is no particularly limitation on a normalization method, and for example, the idf(t) can be normalized according to Formula (2). In Formula (1), N denotes the total number of documents (the quantity of reference text analysis data $AD_{ref}$), and df(t) denotes the number of documents (the quantity of reference text analysis data $AD_{ref}$) where the word t appears. In Formula (2), $idf_{MAX}$ denotes the maximum value of idf(t) of the word included in the reference text analysis data $AD_{ref}$, and $idf_{MIN}$ is the minimum value of idf(f) of the word included in the reference text analysis data $AD_{ref}$.

[Formula 1]

$$idf(t) = \log \frac{N}{df(t)} \qquad (1)$$

$$IDF(t) = \frac{idf(t) - idf_{MIN}}{idf_{MAX} - idf_{MIN}} \qquad (2)$$

A word with a high IDF can be regarded as a characteristic word less likely to appear in the text analysis data $AD_{REF}$. Thus, by estimating normalized IDF data ID of each word, a keyword that is a characteristic word for searching for a desired document and normalized IDF can be extracted.

Next, in the IDF data ID, the IDF assigned to each keyword serves as weight data, and weight dictionary data in which weight data is assigned to each keyword is generated (Step S46). As described above, a word with a high IDF can be regarded as a characteristic word in the reference text analysis data. The appearance frequency of each keyword can be estimated by extracting IDF, and the weight dictionary data in which the weight data in accordance with the appearance frequency is linked to each keyword can be generated. The generated weight dictionary data can be stored in the database 50.

According to the flow chart of FIG. 3, the weight dictionary data can be generated on the basis of the reference document data stored in the database. Each characteristic word (keyword) in the text data is estimated using a value normalized by the IDF, whereby the importance (weight) of each keyword can be estimated. Thus, a document search method that enables highly accurate document search can be provided. Alternatively, highly accurate document search, especially intellectual property-related document search, can be achieved with an easy input method.

Figure 4:
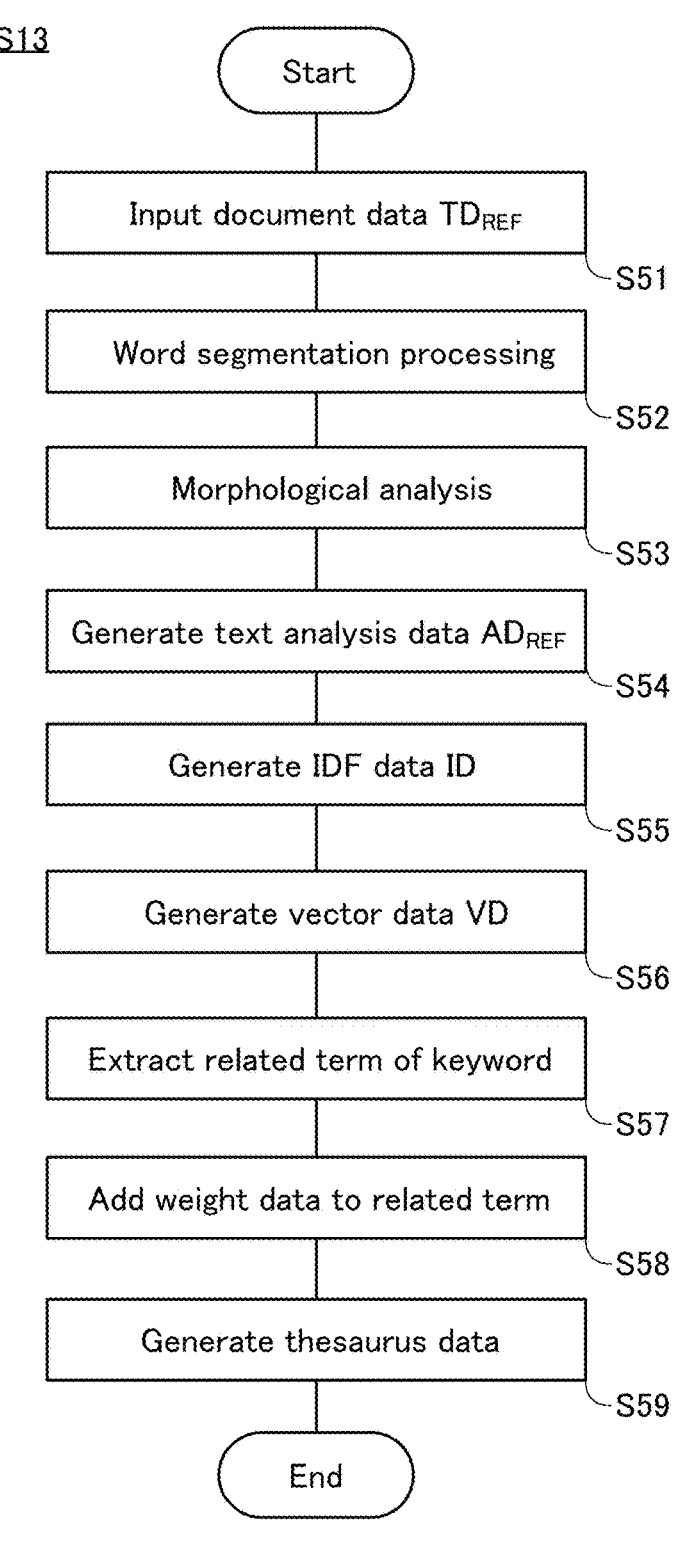
FIG. 4 is a flow chart showing a document search method.

FIG. 4 is a flow chart of Step S12 shown in FIG. 2, in which the thesaurus data is generated.

First, the document data $TD_{REF}$ is input to the processing portion 30 through the input portion 20 (Step S51). Step S51 corresponds to Step S11 described above. Note that Step S51 corresponds to the same processing in Step S41.

Next, word segmentation processing is performed on the document data $TD_{REF}$ (Step S52). After that, processing for modifying inappropriate word segmentation processing is preferably performed. Note that Step S52 corresponds to the same processing in Step S42.

Next, morphological analysis is performed on the document data $TD_{REF}$ subjected to the word segmentation processing (Step S53). Note that Step S53 corresponds to the same processing in Step S43.

Next, text analysis data $AD_{REF}$ (reference text analysis data) of the data subjected to the morphological analysis is generated (Step S54). Note that Step S54 corresponds to the same processing in Step S44.

Next, IDFs of words included in the text analysis data $AD_{REF}$ are calculated, so that IDF data ID is generated (Step S55). Note that Step S55 corresponds to the same processing in Step S45. By estimating normalized IDF data ID of each word, a keyword that is a characteristic word for searching for a desired document and a normalized IDF can be extracted.

Next, the words included in the text analysis data $AD_{REF}$ are extracted and distributed representation vectors of the words are generated, so that vector data VD is generated (Step S56).

The distributed representation of a word is also referred to as word embedding. The distributed representation vector of a word is a vector represented with continuous values quantified with respect to characteristic elements (dimensions). Vectors of words with similar meanings become close to each other.

The distributed representation vector of the word is preferably generated in the processing portion 30 with use of a neural network. Learning of the neural network is conducted with supervised learning. Specifically, one word is given to an input layer, and surrounding words of the word are given to an output layer, thereby having the neural network learn the probability of the surrounding words to the word. It is preferable for a middle layer (hidden layer) to include relatively low-dimensional vectors whose dimension number is greater than or equal to 10 and less than or equal to 1000. The vector after learning is the distributed representation vector of the word.

The distributed representation of the word can be created using an opened-sourced algorithm Word2vec, for example. Word2vec allows words to be vectorized considering characteristics and meaning structures of the words, on the assumption that words used in the same context have the same meaning.

In terms of vectorization of the words, the distributed representation vector of the word is generated, whereby it is possible to calculate the similarity degree, the distance, or the like between the words with calculation of the vectors. When the similarity degree between two vectors is high, the two vectors can be regarded as having high relations. Alternatively, when the distance between two vectors is small, the two vectors can be regarded as having high relations.

Whereas one dimension is assigned to one word in the one-hot representation, words can be represented by low-dimensional real-valued vectors in the distributed representation, which enables the words to be represented with a small number of dimensions even when the volume of vocabulary is increased. Thus, the amount of calculations is less likely to increase even when the number of words included in a corpus is large, and an enormous quantity of data can be processed in a short time.

Next, related terms of the keyword are extracted from the text analysis data $AD_{REF}$ (Step S57). The related terms of the keyword are extracted on the basis of the similarity degree or the proximity of the distance between a distributed representation vector of the keyword and the distributed representation vectors of the words. Then, the related terms are listed in the descending order of the similarity degree or in the descending order of the proximity, so that related term data is generated. Specifically, the number of extracted related terms with respect to one keyword is preferably greater than or equal to 1 and less than or equal to 10, further preferably greater than or equal to 2 and less than or equal to 5. The related term may be a word whose similarity degree is higher than or equal to a predetermined value, a word whose distance is smaller than or equal to a predetermined value, a predetermined number of words highly ranked in the similarity degree, or a predetermined number of words highly ranked in the proximity, for example. The number of synonyms, antonyms, broader terms, narrower terms, and the like varies depending on the keyword. Accordingly, the number of related terms may differ depending on the keyword. The related term of the keyword is extracted from the words included in the text analysis data $AD_{REF}$, whereby even when the keyword is represented as a unique notation by the text analysis data $AD_{REF}$, the notation can be extracted as the related term. Therefore, the above extraction is preferable because omission in searches due to fluctuation of description can be inhibited.

The similarity degree of two vectors can be calculated with use of the cosine similarity, the covariance, the unbiased covariance, Pearson's correlation coefficient, or the like. In particular, the cosine similarity is preferably used. The distance between two vectors can be calculated with use of Euclidean distance, Standard (standardized, average) Euclidean distance, Mahalanobis distance, Manhattan distance, Chebyshev distance, Minkowski distance, or the like.

Next, the weight data is added to the related terms (Step S58). The weight data added to each related term corresponds to the degree of relevance (similarity degree) between the keyword and the related term. Thus, the weight data added to the related term is a value representing the above similarity degree or proximity of the distance or its normalized value. The weight data added to the related term is used later to calculate the weight of the related term used when a search result is scored. Specifically, a product of the normalized IDF of the keyword and the weight data of the related term corresponds to the weight of the related term. Note that the calculated weight of the related term is any value corresponding to a product, and a value corresponding to an intercept of the product may be added to the calculated weight value.

The thesaurus data including a plurality of keywords and their related terms to which the weight data is added is generated using the IDF data ID and the vector data VD (Step S59). The generated thesaurus data can be stored in the database 50.

According to the sequence in FIG. 4, the thesaurus data can be generated on the basis of the plurality of pieces of document data stored in the database. Each related term related to the characteristic word (keyword) in the document data is estimated using a value normalized by the IDF data ID and the vector data VD, whereby the similarity degree (weight) of each related term can be estimated. Thus, a document search method that enables highly accurate document search can be provided. Alternatively, highly accurate document search, especially intellectual property-related document search, can be achieved with an easy input method.

Figure 5:
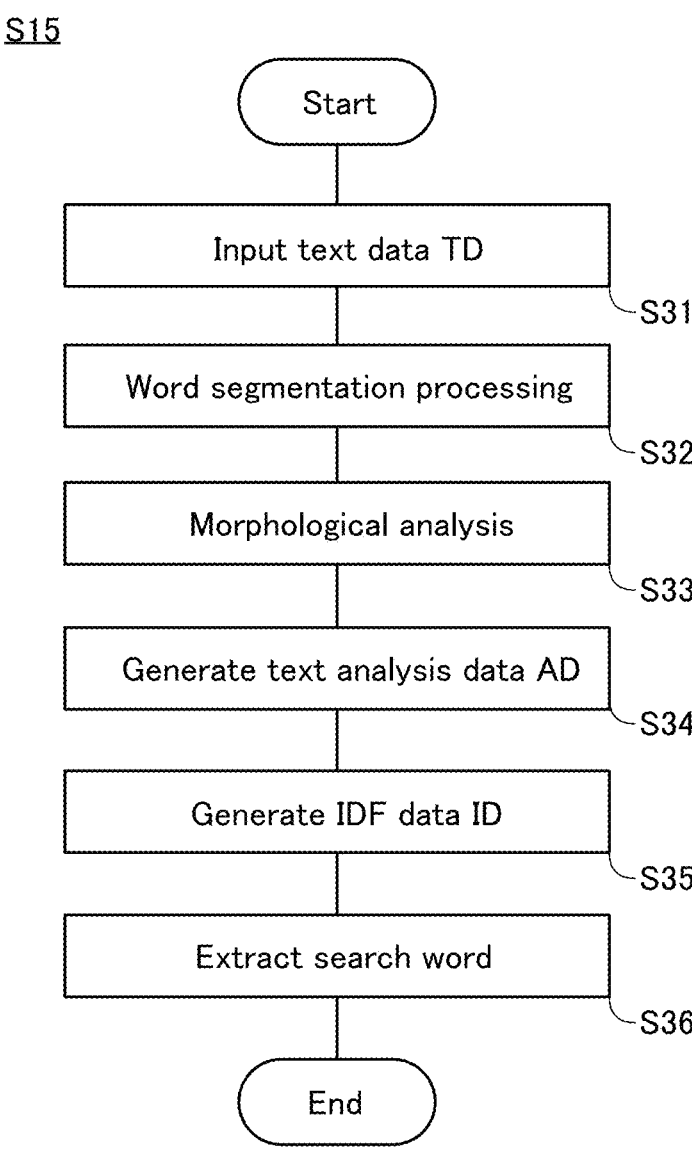
FIG. 5 is a flow chart showing a document search method.

FIG. 5 is a flow chart of Step S15 shown in FIG. 2, in which the search word is extracted.

First, text data (hereinafter, text data TD) is input to the processing portion 30 through the input portion 20 (Step S31). Step S31 corresponds to Step S14 described above.

Next, word segmentation processing is performed on the text data TD (Step S32). After that, processing for modifying inappropriate word segmentation processing is preferably performed.

Next, morphological analysis is performed on the text data TD subjected to the word segmentation processing (Step S33).

Next, text analysis data (hereinafter, text analysis data AD) of the data subjected to the morphological analysis is generated (Step S34). In the morphological analysis, text written in a natural language is divided into morphemes (smallest meaningful units in a language), and parts of speech in the morphemes can be distinguished, for example. Thus, only nouns can be extracted from the text data TD subjected to the word segmentation processing to generate the text analysis data AD, for example.

Next, with reference to the IDF data calculated when the weight dictionary data or the thesaurus data is generated, the IDF data ID according to words included in the text analysis data AD is obtained (Step S35). By obtaining the normalized IDF data ID of each word, a search word that is a characteristic word for searching for a desired document and normalized IDF can be extracted.

Next, a search word is extracted on the basis of the IDF (Step S36). A word with a high IDF is a characteristic word less likely to appear in the text analysis data AD.

According to the sequence in FIG. 5, the search word can be extracted on the basis of the input text data. The characteristic word in the text data is estimated using a value normalized by the IDF, whereby the characteristic word can be extracted as the search word. Thus, a document search method that enables highly accurate document search can be provided. Alternatively, highly accurate document search, especially intellectual property-related document search, can be achieved with an easy input method.

FIG. 6A is a diagram schematically showing data of the search words (SW) extracted from the above-described text data TD. Table data 21TB schematically shows the data of the search words (SW). As examples of the extracted search words, "Word A", "Word B", and "Word C" are shown.

FIG. 6B is a diagram schematically showing the weight dictionary data in which weight data based on the normalized IDF is added to each keyword (KW) generated from the above-described plurality of pieces of document data. Table data 52TB schematically shows the weight dictionary data. As examples of the keywords, "Word A", "Word B", and "Word C" are shown, and the weight data of the keywords are "0.9", "0.9", and "0.8", respectively.

FIG. 6C is a diagram schematically showing the thesaurus data in which related terms for each keyword (KW) extracted from the above-described plurality of pieces of document data are extracted and weight data corresponding to the similarity degree is added to each related term (RW). Table data 53TB schematically shows the thesaurus data.

In the table 53TB, "Word A", "Word B", "Word C", "Word D", and "Word E" are shown as examples of the keywords (KW). "Word X", "Word Y", "Word Z", and "Word a" are shown as examples of the related terms of "Word A", and the weight data of the related terms are "0.9", "0.8", "0.6", and "0.5", respectively. Similarly, "Word b", "Word c", "Word d", and "Word e" are shown as examples of the related terms of "Word B", and the weight data of the related terms are "0.5", "0.5", "0.45", and "0.3", respectively. "Word f", "Word g", "Word h", and "Word i" are shown as examples of the related terms of "Word C", and the weight data of the related terms are "0.75", "0.75", "0.75", and "0.75", respectively. "Word j", "Word k", "Word m", and "Word n" are shown as examples of the related terms of "Word D", and the weight data of the related terms are "0.5", "0.3", "0.3", and "0.1", respectively. "Word p", "Word q", "Word r", and "Word s" are shown as examples of the related terms of "Word E", and the weight data of the related terms are "0.75", "0.65", "0.65", and "0.6", respectively.

FIG. 7 is a diagram schematically showing search data generated with reference to the weight dictionary data and the thesaurus data. In table data 61TB, the weights of "Word A", "Word B", and "Word C" shown in the table data 21TB including the search words SW are set to "0.9", "0.9", and "0.8" with reference to the table data 52TB. In addition, as for the related terms of the keywords KW, with reference to the table data 53TB, "Word X", "Word Y", "Word Z", and "Word a" are shown as examples of the related terms of "Word A", and the weights of the related terms are set to "0.9", "0.8", "0.6", and "0.5", respectively. Similarly, "Word b", "Word c", "Word d", and "Word e" are shown as examples of the related terms of "Word B", and the weights of the related terms are set to "0.5", "0.5", "0.45", and "0.3", respectively. "Word f", "Word g", "Word h", and "Word i" are shown as examples of the related terms of "Word C", and the weights of the related terms are set to "0.75", "0.75", "0.75", and "0.75", respectively.

The table data 61TB shown in FIG. 7 is displayed on a display device provided outside the document search system 10. The user looks at the search data, as shown in the table data 61TB, displayed on the display device provided outside the document search system 10 and can modify the weight data of a term that is obviously inappropriate for the related term or the weight data of a related term that is obviously highly relevant.

For example, in the case where the user determines that the degree of relevance of "Word a" to "Word A" is high, the weight of the related term in the table data 61TB shown in FIG. 7 is modified from "0.5" to "1.0" as shown in FIG. 8. Similarly, in the case where the user determines that the degree of relevance of "Word c" to "Word B" is low, the weight of the related term is modified from "0.5" to "0.0". Similarly, in the case where the user determines that the degree of relevance of "Word h" to "Word C" is high, the weight of the related term is modified from "0.75" to "1.0". Note that the related terms with modified weight data are hatched.

When the user make modification as shown in FIG. 8, the search data (first search data: corresponding to the table data 61TB) becomes modified search data (second search data: corresponding to table data 62TB).

Note that update of the thesaurus data is not limited to the example shown in FIG. 8. For example, in the case where the weight data of a related term is modified from "0.5" to "1.0", the weight data may be modified in consideration of the contribution ratio. For example, a product of the contribution ratio and a difference between the weight data before modification and the weight data after modification may be added to the weight data before modification to give the weight data after modification. In such a case, given that the contribution ratio is 0.1, the weight data before modification is 0.5, and the weight data after modification is 1.0, the weight data after modification is updated to 0.55 according to "0.5+0.1×(1.0−0.5)". Therefore, in updating the thesaurus data, update can be performed not only on the basis of modification made by one user but also on the basis of modification made by a plurality of users.

FIG. 9 is a diagram schematically showing the thesaurus data that is updated when the search data is modified as shown in FIG. 8. In regard of the related terms RW (hatched portions) with modified weight data and the corresponding keywords KW shown in FIG. 8, the thesaurus data is modified on the basis of the modified weight data. Specifically, the table data 53TB schematically showing the thesaurus data before update, which is shown in FIG. 9, can be updated to table data 53TB_re.

As shown in FIG. 9, the rankings of the related terms RW with updated weight data, which are linked to the keywords, are changed. The thesaurus data is updated in this manner, whereby a document search method that enables document search with user's determination standards taken into account can be provided. Thus, a document search method that enables highly accurate document search can be provided. Alternatively, highly accurate document search, especially intellectual property-related document search, can be achieved with an easy input method.

Figure 10:
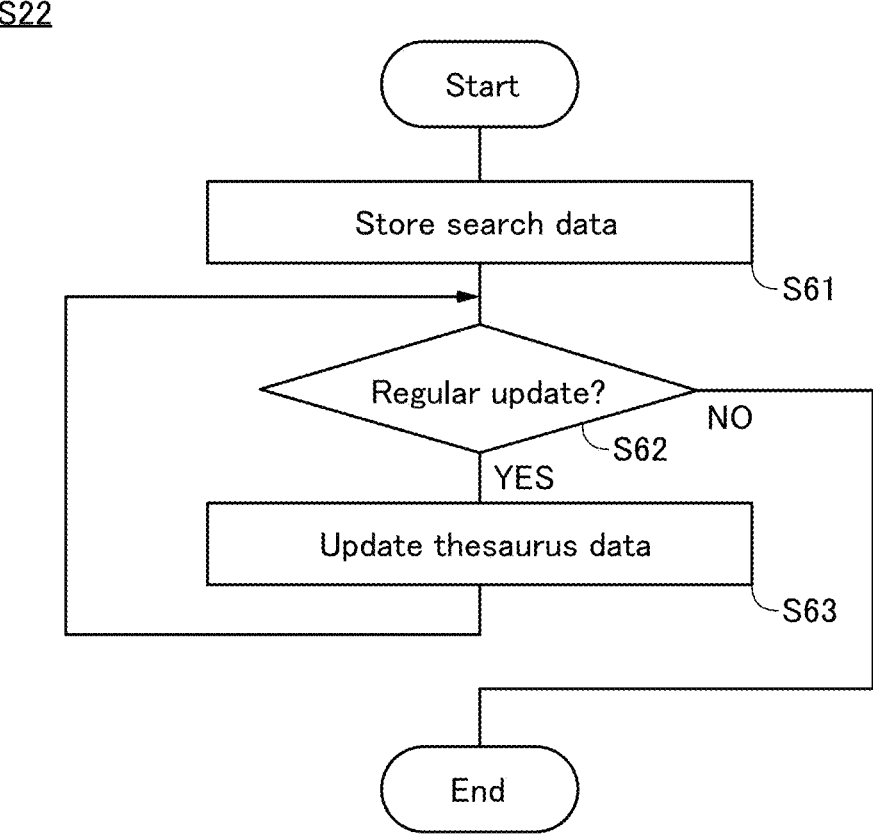
FIG. 10 is a flow chart showing a document search method.

FIG. 10 is a flow chart of Step S22 shown in FIG. 2, in which the thesaurus data is updated.

First, the search data modified by the user is stored in the memory portion through the input portion (Step S61). Step S61 corresponds to Step S20 shown in FIG. 2.

Next, whether regular update of the thesaurus data is performed or not is determined (Step S62). Regular update is performed using a timer or the like. If it is timing of updating, the thesaurus data is updated (Step S63). If update is not performed, the processing is terminated. The thesaurus data is updated in Step S63 regardless of whether the search data is stored or not in Step S61.

Figure 11:
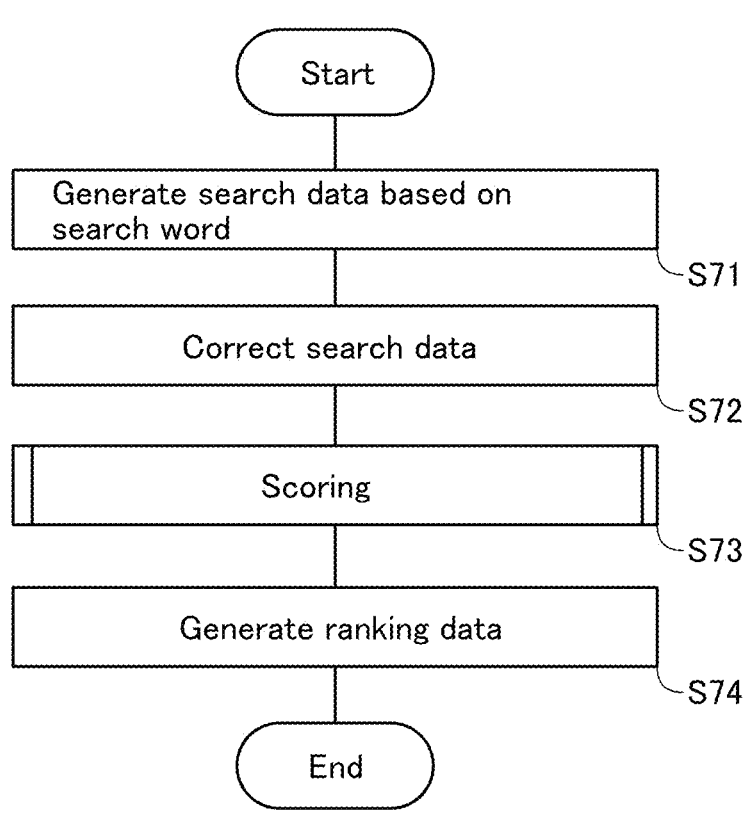
FIG. 11 is a flow chart showing a document search method.

FIG. 11 is a flow chart showing the search execution in Step S19 shown in FIG. 2. First, search data based on a search word is generated (Step S71). Step S71 corresponds to Step S16 described above.

Next, the generated search data is modified (Step S72). Step S72 corresponds to Step S18 described above. When the user edits (modifies) the weight data in this manner, the search accuracy can be enhanced.

Next, a score based on the weight data added to the search data is given to the reference text analysis data $AD_{ref}$ (scoring) (Step S73). Processing of scoring a plurality of pieces of reference text analysis data $AD_{ref}$ is described later with reference to FIG. 12 and the like.

Next, ranking data is generated on the basis of the scores given to the respective pieces of reference text analysis data $AD_{ref}$ (Step S74).

The ranking data can include ranks (Rank), information on reference text data $TD_{ref}$ (name, identification number, etc.) (Doc), scores (Score), and the like. Note that when the reference text data $TD_{ref}$ is stored in the database 50 or the like, the ranking data preferably includes a file path to the reference text data $TD_{ref}$. Thus, the user can freely access a target document from the ranking data.

As the score of the reference text analysis data $AD_{ref}$ is high, it can be said that the text analysis data $AD_{ref}$ is related or similar to the text data TD.

The document search system of one embodiment of the present invention has a function of extracting a keyword and a related term of the keyword by extracting a search word on the basis of text data and referring to thesaurus data and weight dictionary data for the search word. Thus, the user of the document search system of one embodiment of the present invention does not need to select a keyword used for a search by him-or-her-self. The user can directly input the text data with higher volume than the keyword to the document search system. Furthermore, in the case where the user desires to select a keyword and a related term, there is no need to start the selection operation at the beginning; the user may conduct addition, modification, deletion, or the like on keywords and related terms with reference to the keywords and the related terms extracted by the document search system. Thus, it is possible to relieve the difficulty for the user in the document search, and a difference in search results depending on users' skills can be less likely to occur.

Figure 12:
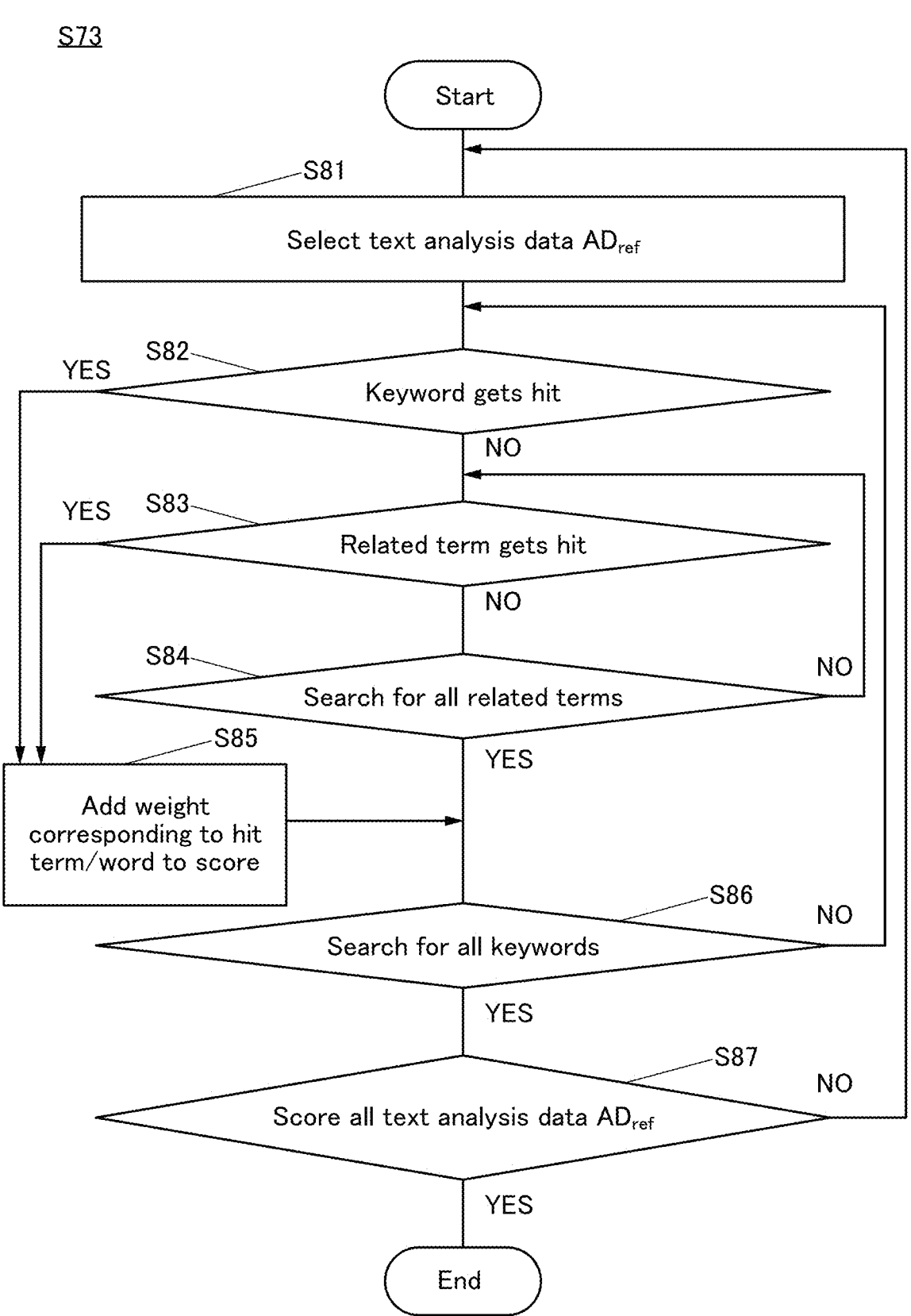
FIG. 12 is a flow chart showing a document search method.

FIG. 12 is a flow chart showing scoring of the reference text analysis data $AD_{ref}$ on the basis of the weight data added to the search data, which is in Step S73 shown in FIG. 11.

One piece of the reference text analysis data $AD_{ref}$ that is not scored is selected (Step S81).

Next, whether the keyword KW gets a hit in the reference text analysis data $AD_{ref}$ is determined (Step S82). In the case where the keyword KW gets a hit, the processing proceeds to Step S85. In the case where the keyword KW does not get a hit, the processing proceeds to Step S83.

Next, whether the related term RW of the keyword KW gets a hit in the reference text analysis data $AD_{ref}$ is determined (Step S83). In the case where the related term RW gets a hit, the processing proceeds to Step S85. In the case where the related term RW does not get a hit, the processing proceeds to Step S84.

Next, whether a search for all the related terms of the keyword KW is performed is determined (Step S84). In the case where the search is done, the processing proceeds to Step S86. In the case where the search is not done, the processing proceeds to Step S83. For example, in the case where there are two related terms RW of the keyword KW and where determination of whether the first related term RW gets a hit is done in the previous Step S83, the processing returns to Step S83, and whether the second related term RW gets a hit is determined.

In Step S85, a weight corresponding to the hit word/term is added to the score. In the case where the word gets a hit in Step S82, weight data of the keyword KW is added to the score. In the case where the term gets a hit in Step S83, a product of the weight data of keyword $KW_x$ and the weight data of the related term RW is added to the score.

Next, whether a search for all of the keywords KW is done is determined (Step S86). In the case where the search is done, the processing proceeds to Step S87. In the case where the search is not done, the processing proceeds to Step S82. For example, in the case where there are two keywords KW and where determination of whether the first keyword KW gets a hit is done in the previous Step S82, the processing returns to Step S82, and whether the second keyword KW gets a hit is determined.

Next, whether all pieces of the reference text analysis data $AD_{ref}$ are scored is determined (Step S87). In the case where all scoring is finished, the processing is terminated. In the case where all scoring is not finished, the processing proceeds to Step S81.

As described above, a search can be performed with use of the document search system 10.

In this manner, the document search system of this embodiment can search documents prepared in advance for documents related or similar to the input document. It is not necessary for a user to select keywords used for a search, and text data with a larger volume than the keywords can be used for a search; accordingly, differences in search accuracy among individuals can be reduced and documents can be searched easily and accurately. Furthermore, the document search system of this embodiment extracts the related terms of the keyword from the documents prepared in advance, and accordingly can extract unique notation included in the documents as the related term, which enables omission in searches to be inhibited. Moreover, the document search system of this embodiment can output search results that are ranked on the basis of the relevance or the similarity degree; accordingly, it becomes easy for a user to find a necessary document from the search results, and oversight less occurs.

This embodiment can be combined with the other embodiments as appropriate. In this specification, in the case where a plurality of structure examples are shown in one embodiment, the structure examples can be combined as appropriate.

Embodiment 2

In this embodiment, a structure example of a semiconductor device which can be used for a neural network is described.

The semiconductor device of this embodiment can be used for a processing portion in a document search system of one embodiment of the present invention, for example.

Figures 13A, 13B:
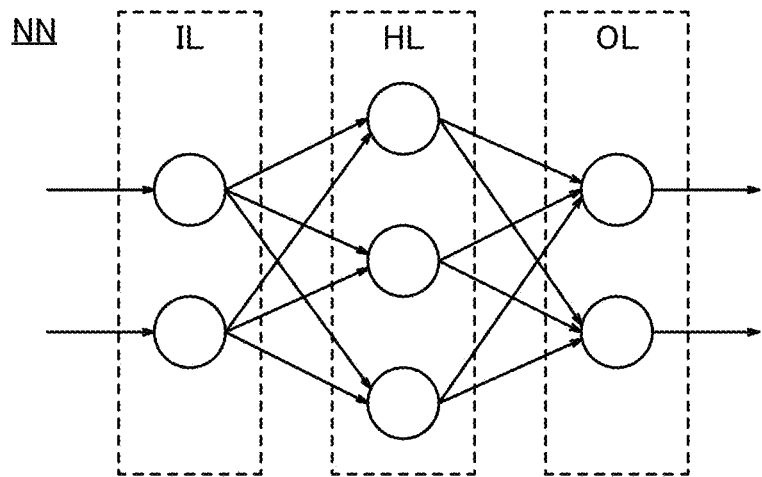
FIG. 13A and FIG. 13B are diagrams showing a structure example of a neural network.

As shown in FIG. 13A, a neural network NN can be formed of an input layer IL, an output layer OL, and a middle layer (hidden layer) HL. The input layer IL, the output layer OL, and the middle layer HL each include one or more neurons (units). Note that the middle layer HL may be composed of one layer or two or more layers. A neural network including two or more middle layers HL can also be referred to as a DNN (deep neural network), and learning using a deep neural network can also be referred to as deep learning.

Input data is input to neurons in the input layer IL, output signals of neurons in the previous layer or the subsequent layer are input to neurons in the middle layer HL, and output signals of neurons in the previous layer are input to neurons in the output layer OL. Note that each neuron may be connected to all the neurons in the previous and subsequent layers (full connection), or may be connected to some of the neurons.

FIG. 13B shows an example of a calculation with the neurons. Here, a neuron N and two neurons in the previous layer which output signals to the neuron N are illustrated. An output $x_1$ of a neuron in the previous layer and an output $x_2$ of a neuron in the previous layer are input to the neuron N. Then, in the neuron N, a total sum $x_1w_1+x_2w_2$ of a multiplication result $(x_1w_1)$ of the output $x_1$ and a weight $w_1$ and a multiplication result $(x_2w_2)$ of the output $x_2$ and a weight $w_2$ is calculated, and then a bias b is added as necessary, so that a value $a=x_1w_1+x_2w_2+b$ is obtained. Then, the value a is converted with an activation function h, and an output signal $y=h(a)$ is output from the neuron N.

In this manner, the calculation with the neurons includes the calculation that sums the products of the outputs and the weights of the neurons in the previous layer, that is, the product-sum operation $(x_1w_1+x_2w_2$ described above). This product-sum operation may be performed using a program on software or using hardware. In the case where the product-sum operation is performed by hardware, a product-sum operation circuit can be used. Either a digital circuit or an analog circuit can be used as this product-sum operation circuit. In the case where an analog circuit is used as the product-sum operation circuit, the circuit scale of the product-sum operation circuit can be reduced, or higher processing speed and lower power consumption can be achieved by reduced frequency of access to a memory.

The product-sum operation circuit may be formed using a transistor including silicon (such as single crystal silicon) in a channel formation region (also referred to as a "Si transistor") or may be formed using a transistor including an oxide semiconductor, which is a kind of metal oxide, in a channel formation region (also referred to as an "OS transistor"). An OS transistor is particularly preferably used as a transistor included in a memory of the product-sum operation circuit because of its extremely low off-state current. Note that the product-sum operation circuit may include both a Si transistor and an OS transistor. A structure example of a semiconductor device having a function of the product-sum operation circuit is described below.

<Structure Example of Semiconductor Device>

Figure 14:
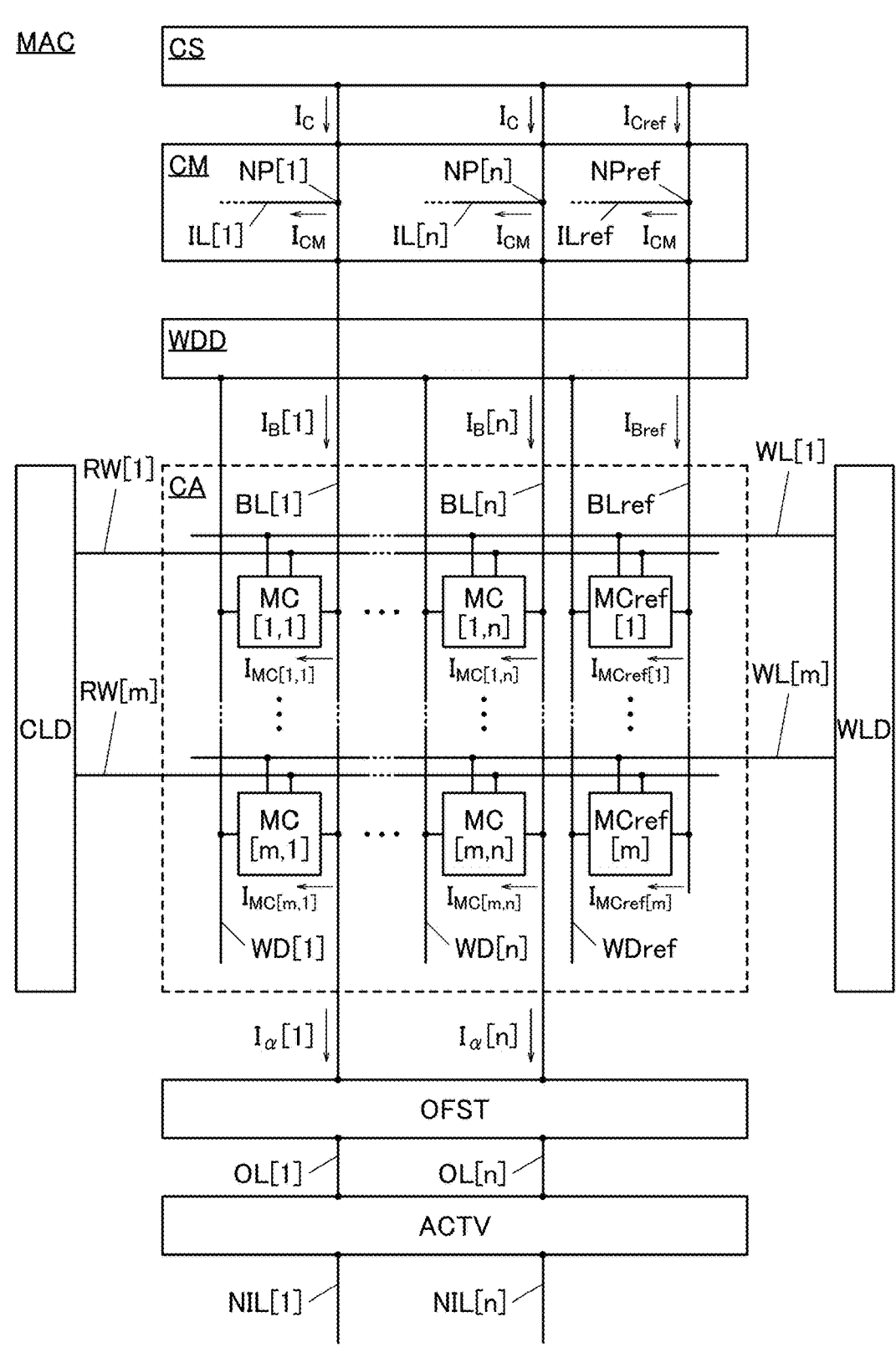
FIG. 14 is a diagram showing a structure example of a semiconductor device.

FIG. 14 shows a structure example of a semiconductor device MAC having a function of performing a calculation of a neural network. The semiconductor device MAC has a function of performing a product-sum operation of first data corresponding to the connection strength (weight) between the neurons and second data corresponding to input data. Note that the first data and the second data can each be analog data or multilevel digital data (discrete data). The semiconductor device MAC also has a function of converting data obtained by the product-sum operation with an activation function.

The semiconductor device MAC includes a cell array CA, a current source circuit CS, a current mirror circuit CM, a circuit WDD, a circuit WLD, a circuit CLD, an offset circuit OFST, and an activation function circuit ACTV.

The cell array CA includes a plurality of memory cells MC and a plurality of memory cells MCref. FIG. 14 illustrates a structure example in which the cell array CA includes the memory cells MC in m rows and n columns (MC[1, 1] to MC[m, n]) and the m memory cells MCref (MCref[1] to MCref[m]) (m and n are integers greater than or equal to 1). The memory cells MC each have a function of storing the first data. In addition, the memory cells MCref each have a function of storing reference data used for the product-sum operation. Note that the reference data can be analog data or multilevel digital data.

The memory cell MC[i, j] (i is an integer greater than or equal to 1 and less than or equal to m, and j is an integer greater than or equal to 1 and less than or equal to n) is connected to a wiring WL[i], a wiring RW[i], a wiring WD[j], and a wiring BL[j]. In addition, the memory cell MCref[i] is connected to the wiring WL[i], the wiring RW[i], a wiring WDref, and a wiring BLref. Here, a current flowing between the memory cell MC[i, j] and the wiring BL[j] is denoted by $I_{MC[i,\,j]}$, and a current flowing between the memory cell MCref[i] and the wiring BLref is denoted by $I_{MCref[i]}$.

Figure 15:
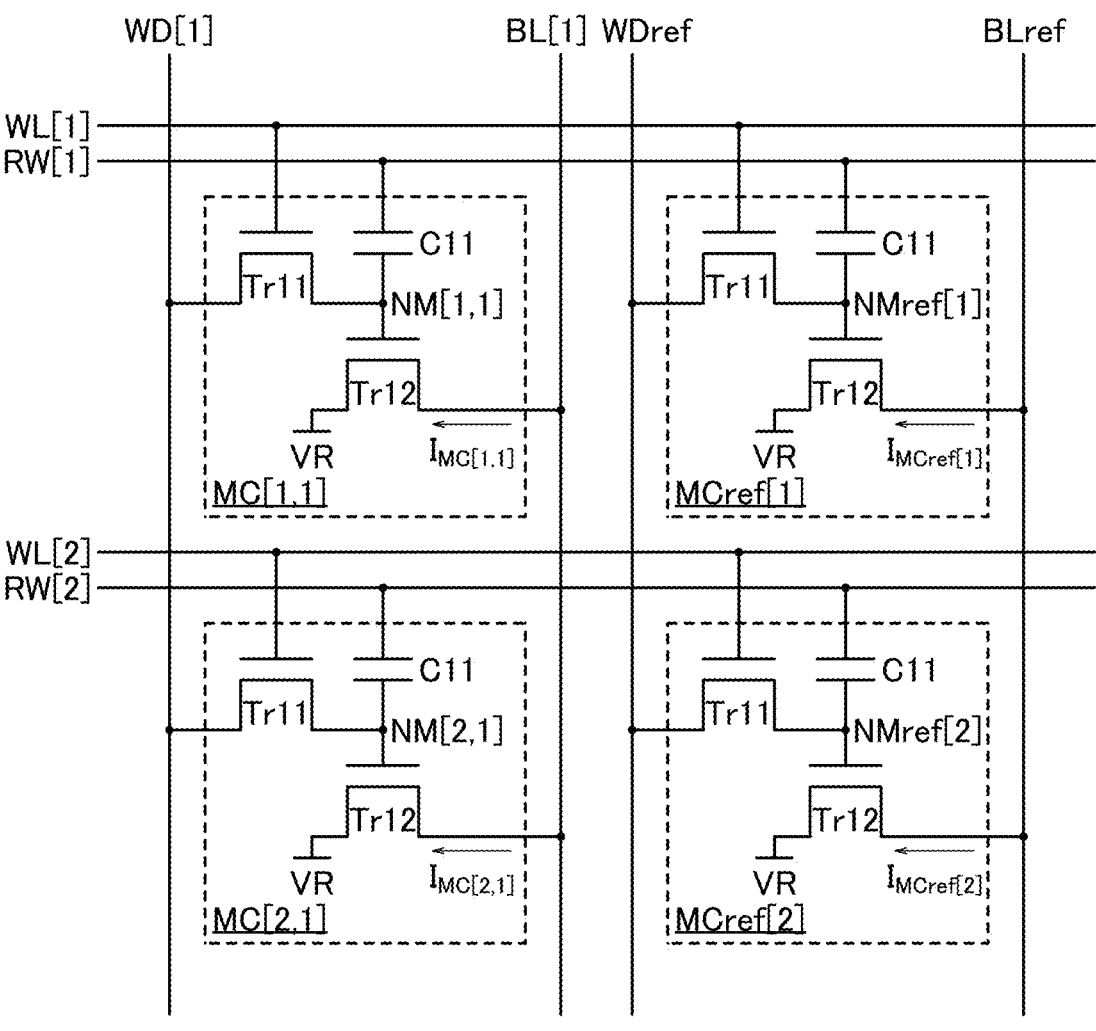
FIG. 15 is a diagram showing a structure example of memory cells.

FIG. 15 shows a specific structure example of the memory cells MC and the memory cells MCref. Although the memory cells MC[1, 1] and MC[2, 1] and the memory cells MCref[1] and MCref[2] are illustrated in FIG. 15 as typical examples, similar structures can be used for other memory cells MC and memory cells MCref. The memory cells MC and the memory cells MCref each include a transistor Tr11, a transistor Tr12, and a capacitor C11. Here, the case where the transistor Tr11 and the transistor Tr12 are n-channel transistors is described.

In the memory cell MC, a gate of the transistor Tr11 is connected to the wiring WL, one of a source and a drain is connected to a gate of the transistor Tr12 and a first electrode of the capacitor C11, and the other of the source and the drain is connected to the wiring WD. One of a source and a drain of the transistor Tr12 is connected to the wiring BL, and the other of the source and the drain of the transistor Tr12 is connected to a wiring VR. A second electrode of the capacitor C11 is connected to the wiring RW. The wiring VR is a wiring having a function of supplying a predetermined potential. Here, the case where a low power supply potential (e.g., a ground potential) is supplied from the wiring VR is described as an example.

A node connected to the one of the source and the drain of the transistor Tr11, the gate of the transistor Tr12, and the first electrode of the capacitor C11 is referred to as a node NM. The nodes NM in the memory cells MC[1, 1] and MC[2, 1] are referred to as nodes NM[1, 1] and NM[2, 1], respectively.

The memory cells MCref have a structure similar to that of the memory cell MC. However, the memory cells MCref are connected to the wiring WDref instead of the wiring WD and connected to the wiring BLref instead of the wiring BL. Nodes in the memory cells MCref[1] and MCref[2] each of which is connected to the one of the source and the drain of the transistor Tr11, the gate of the transistor Tr12, and the first electrode of the capacitor C11 are referred to as nodes NMref[1] and NMref[2], respectively.

The nodes NM and NMref function as holding nodes of the memory cell MC and the memory cell MCref, respectively. The first data is held in the node NM and the reference data is held in the node NMref. Currents $I_{MC[1,1]}$ and $I_{MC[2,1]}$ from the wiring BL[1] flow to the transistors Tr12 of the memory cells MC[1, 1] and MC[2, 1], respectively. Currents $I_{MCref[1]}$ and $I_{MCref[2]}$ from the wiring BLref flow to the transistors Tr12 of the memory cells MCref[1] and MCref[2], respectively.

Since the transistor Tr11 has a function of holding the potential of the node NM or the node NMref, the off-state current of the transistor Tr11 is preferably low. Thus, it is preferable to use an OS transistor, which has extremely low off-state current, as the transistor Tr11. This suppresses a change in the potential of the node NM or the node NMref, so that the calculation accuracy can be increased. Furthermore, operations of refreshing the potential of the node NM or the node NMref can be performed less frequently, which leads to a reduction in power consumption.

There is no particular limitation on the transistor Tr12, and for example, a Si transistor, an OS transistor, or the like can be used. In the case where an OS transistor is used as the transistor Tr12, the transistor Tr12 can be manufactured with the same manufacturing apparatus as that for the transistor Tr11, and accordingly manufacturing cost can be reduced. Note that the transistor Tr12 may be an n-channel transistor or a p-channel transistor.

The current source circuit CS is connected to the wirings BL[1] to BL[n] and the wiring BLref. The current source circuit CS has a function of supplying currents to the wirings BL[1] to BL[n] and the wiring BLref. Note that the value of the current supplied to the wirings BL[1] to BL[n] may be different from the value of the current supplied to the wiring BLref. Here, the current supplied from the current source circuit CS to the wirings BL[1] to BL[n] is denoted by $I_C$, and the current supplied from the current source circuit CS to the wiring BLref is denoted by $I_{Cref}$.

The current mirror circuit CM includes wirings IL[1] to IL[n] and a wiring ILref. The wirings IL[1] to IL[n] are connected to the wirings BL[1] to BL[n], respectively, and the wiring ILref is connected to the wiring BLref. Here, portions where the wirings IL[1] to IL[n] are connected to the respective wirings BL[1] to BL[n] are referred to as nodes NP [1] to NP [n]. Furthermore, a connection portion between the wiring ILref and the wiring BLref is referred to as a node NPref.

The current mirror circuit CM has a function of making a current Icy corresponding to the potential of the node NPref flow to the wiring ILref and a function of making this current $I_{CM}$ flow also to the wirings IL[1] to IL[n]. In the example illustrated in FIG. 14, the current $I_{CM}$ is discharged from the wiring BLref to the wiring ILref, and the current $I_{CM}$ is discharged from the wirings BL[1] to BL[n] to the wirings IL[1] to IL[n]. Furthermore, currents flowing from the current mirror circuit CM to the cell array CA through the wirings BL[1] to BL[n] are denoted by $I_B[1]$ to $I_B[n]$. Furthermore, a current flowing from the current mirror circuit CM to the cell array CA through the wiring BLref is denoted by $I_{Bref}$.

The circuit WDD is connected to the wirings WD[1] to WD[n] and the wiring WDref. The circuit WDD has a function of supplying a potential corresponding to the first data stored in the memory cells MC to the wirings WD[1] to WD[n]. The circuit WDD also has a function of supplying a potential corresponding to the reference data stored in the memory cell MCref to the wiring WDref. The circuit WLD is connected to the wirings WL[1] to WL[m]. The circuit WLD has a function of supplying a signal for selecting the memory cell MC or the memory cell MCref to which data is to be written, to any of the wirings WL[1] to WL[m]. The circuit CLD is connected to the wirings RW[1] to RW[m]. The circuit CLD has a function of supplying a potential corresponding to the second data to the wirings RW[1] to RW[m].

The offset circuit OFST is connected to the wirings BL[1] to BL[n] and wirings OL[1] to OL[n]. The offset circuit OFST has a function of detecting the amount of currents flowing from the wirings BL[1] to BL[n] to the offset circuit OFST and/or the amount of change in the currents flowing from the wirings BL[1] to BL[n] to the offset circuit OFST. The offset circuit OFST also has a function of outputting detection results to the wirings OL[1] to OL[n]. Note that the offset circuit OFST may output currents corresponding to the detection results to the wirings OL, or may convert the currents corresponding to the detection results into voltages to output the voltages to the wirings OL. The currents flowing between the cell array CA and the offset circuit OFST are denoted by $I_\alpha[1]$ to $I_\alpha[n]$.

Figure 16:
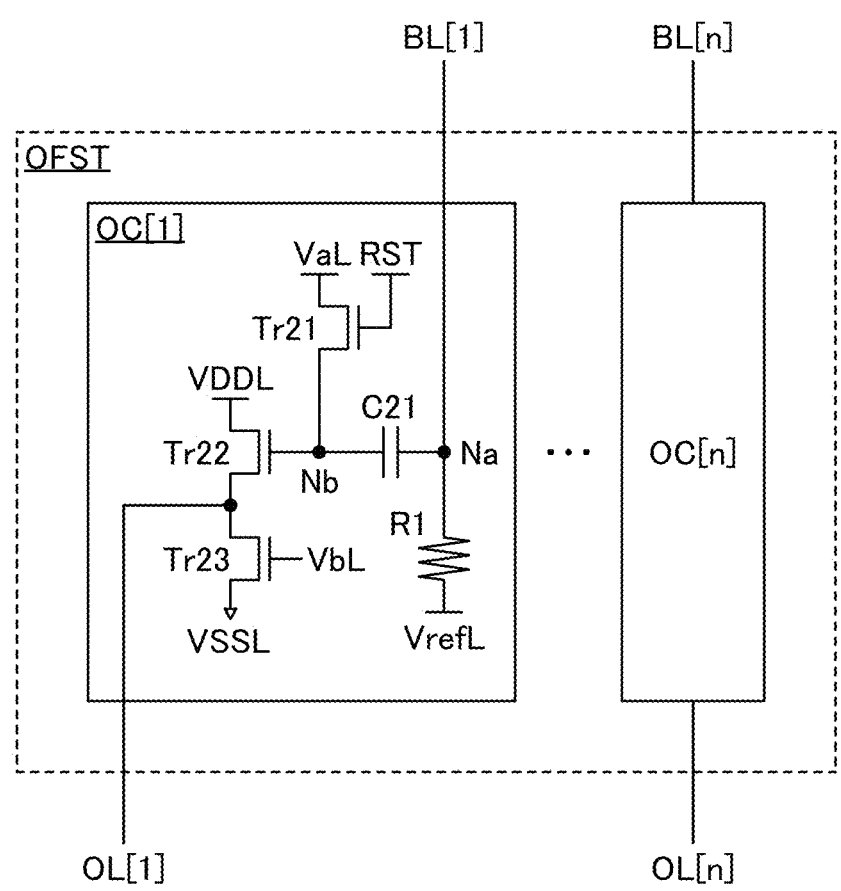
FIG. 16 is a diagram showing a structure example of an offset circuit.

FIG. 16 illustrates a structure example of the offset circuit OFST. The offset circuit OFST illustrated in FIG. 16 includes circuits OC[1] to OC[n]. The circuits OC[1] to OC[n] each include a transistor Tr21, a transistor Tr22, a transistor Tr23, a capacitor C21, and a resistor R1. Connection relationships of the elements are shown in FIG. 16. Note that a node connected to a first electrode of the capacitor C21 and a first terminal of the resistor R1 is referred to as a node Na. In addition, a node connected to a second electrode of the capacitor C21, one of a source and a drain of the transistor Tr21, and a gate of the transistor Tr22 is referred to as a node Nb.

A wiring VrefL has a function of supplying a potential Vref, a wiring VaL has a function of supplying a potential Va, and a wiring VbL has a function of supplying a potential Vb. Furthermore, a wiring VDDL has a function of supplying a potential VDD, and a wiring VSSL has a function of supplying a potential VSS. Here, the case where the potential VDD is a high power supply potential and the potential VSS is a low power supply potential is described. A wiring RST has a function of supplying a potential for controlling the conduction state of the transistor Tr21. The transistor Tr22, the transistor Tr23, the wiring VDDL, the wiring VSSL, and the wiring VbL form a source follower circuit.

Next, an operation example of the circuits OC[1] to OC[n] is described. Note that although an operation example of the circuit OC[1] is described here as a typical example, the circuits OC[2] to OC[n] can operate in a similar manner. First, when a first current flows to the wiring BL[1], the potential of the node Na becomes a potential corresponding to the first current and the resistance value of the resistor R1. At this time, the transistor Tr21 is on, and thus the potential Va is supplied to the node Nb. Then, the transistor Tr21 is turned off.

Next, when a second current flows to the wiring BL[1], the potential of the node Na becomes a potential corresponding to the second current and the resistance value of the resistor R1. At this time, since the transistor Tr21 is off and the node Nb is in a floating state, the potential of the node Nb is changed owing to capacitive coupling, following the change in the potential of the node Na. Here, when the amount of change in the potential of the node Na is $\Delta V_{Na}$ and the capacitive coupling coefficient is 1, the potential of the node Nb is Va+$\Delta V_{Na}$. In addition, when the threshold voltage of the transistor Tr22 is $V_{th}$, a potential of Va+$\Delta V_{Na}$-

$V_{th}$ is output from the wiring OL[1]. Here, when Va=$V_{th}$, the potential $\Delta V_{Na}$ can be output from the wiring OL[1].

The potential $\Delta V_{Na}$ is determined by the amount of change from the first current to the second current, the resistance value of the resistor R1, and the potential Vref. Here, since the resistance value of the resistor R1 and the potential Vref are known, the amount of change in the current flowing to the wiring BL can be found from the potential $\Delta V_{Na}$.

A signal corresponding to the amount of current and/or the amount of change in the current that are/is detected by the offset circuit OFST as described above is input to the activation function circuit ACTV through the wirings OL[1] to OL[n].

The activation function circuit ACTV is connected to the wirings OL[1] to OL[n] and wirings NIL[1] to NIL[n]. The activation function circuit ACTV has a function of performing a calculation for converting the signal input from the offset circuit OFST in accordance with the predefined activation function. As the activation function, for example, a sigmoid function, a tan h function, a softmax function, a ReLU function, a threshold function, or the like can be used. The signal converted by the activation function circuit ACTV is output as output data to the wirings NIL[1] to NIL[n].

Operation Example of Semiconductor Device

With the above semiconductor device MAC, the product-sum operation of the first data and the second data can be performed. An operation example of the semiconductor device MAC at the time of performing the product-sum operation is described below.

Figure 17:
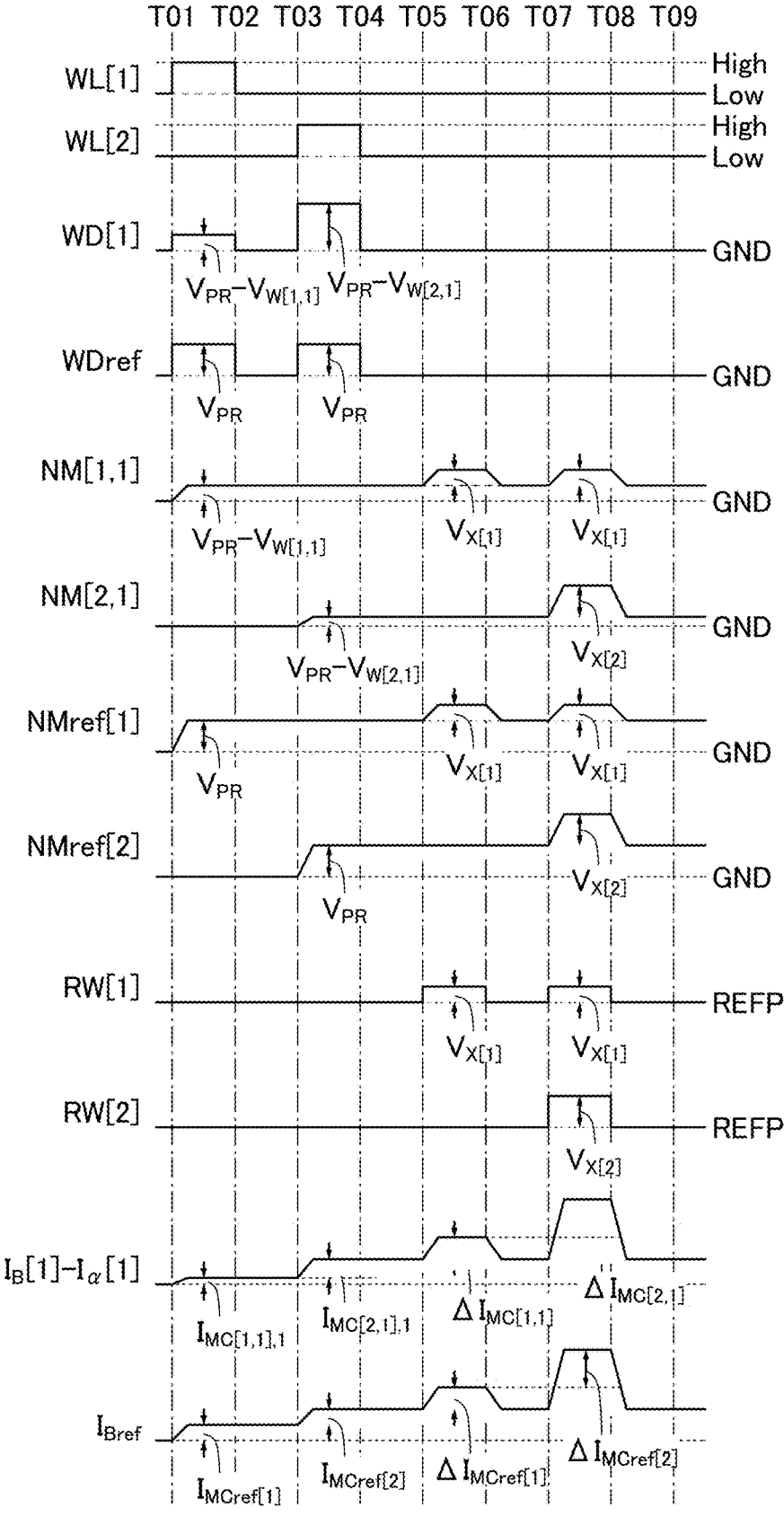
FIG. 17 is a timing chart.

FIG. 17 shows a timing chart of the operation example of the semiconductor device MAC. FIG. 17 shows changes in the potentials of the wiring WL[1], the wiring WL[2], the wiring WD[1], the wiring WDref, the node NM[1, 1], the node NM[2, 1], the node NMref[1], the node NMref[2], the wiring RW[1], and the wiring RW[2] in FIG. 15 and changes in the values of the current $I_B[1]$–$I_\alpha[1]$ and the current $I_{Bref}$. The current $I_B[1]$–$I\alpha[1]$ corresponds to the sum total of the currents flowing from the wiring BL[1] to the memory cells MC[1, 1] and MC[2, 1].

Although an operation is described with a focus on the memory cells MC[1, 1] and MC[2, 1] and the memory cells MCref[1] and MCref[2] illustrated in FIG. 15 as a typical example, the other memory cells MC and the other memory cells MCref can be operated in a similar manner.

[Storage of First Data]

First, in a period from Time T01 to Time T02, the potential of the wiring WL[1] becomes a high level (High), the potential of the wiring WD[1] becomes a potential greater than a ground potential (GND) by $V_{PR}$–$V_{W[1, 1]}$, and the potential of the wiring WDref becomes a potential greater than the ground potential by $V_{PR}$. The potentials of the wiring RW[1] and the wiring RW[2] become reference potentials (REFP). Note that the potential $V_{W[1, 1]}$ is a potential corresponding to the first data stored in the memory cell MC[1, 1]. The potential $V_{PR}$ is the potential corresponding to the reference data. Thus, the transistors Tr11 included in the memory cell MC[1, 1] and the memory cell MCref[1] are brought into on states, and the potential of the node NM[1, 1] becomes $V_{PR}$–$V_{W[1, 1]}$ and the potential of the node NMref[1] becomes $V_{PR}$.

In this case, a current $I_{MC[1, 1], 0}$ flowing from the wiring BL[1] to the transistor Tr12 in the memory cell MC[1, 1] can be expressed by a formula shown below. Here, k is a constant determined by the channel length, the channel width, the mobility, the capacitance of a gate insulating film, and the like of the transistor Tr12. In addition, $V_{th}$ is the threshold voltage of the transistor Tr12.

$$I_{MC[1,1]}, 0 = k(V_{PR} - V_{W[1,1]} - V_{th})^2 \qquad (E1)$$

A current $I_{MCref[1], 0}$ flowing from the wiring BLref to the transistor Tr12 in the memory cell MCref[1] can be expressed by a formula shown below.

$$I_{MCref[1],0} = k(V_{PR} - V_{th})^2 \qquad (E2)$$

Next, in a period from Time T02 to Time T03, the potential of the wiring WL[1] becomes a low level (Low). Consequently, the transistors Tr11 included in the memory cell MC[1, 1] and the memory cell MCref[1] are brought into off states, and the potentials of the node NM[1, 1] and the node NMref[1] are held.

As described above, an OS transistor is preferably used as the transistor Tr11. This can suppress the leakage current of the transistor Tr11, so that the potentials of the node NM[1, 1] and the node NMref[1] can be held accurately.

Next, in a period from Time T03 to Time T04, the potential of the wiring WL[2] becomes the high level, the potential of the wiring WD[1] becomes a potential greater than the ground potential by $V_{PR}-V_{W[2, 1]}$, and the potential of the wiring WDref becomes a potential greater than the ground potential by $V_{PR}$. Note that the potential $V_{W[2, 1]}$ is a potential corresponding to the first data stored in the memory cell MC[2, 1]. Thus, the transistors Tr11 included in the memory cell MC[2, 1] and the memory cell MCref[2] are brought into on states, and the potential of the node NM[2, 1] becomes $V_{PR}-V_{W[2, 1]}$ and the potential of the node NMref[2] becomes $V_{PR}$.

Here, a current $I_{MC[2, 1], 0}$ flowing from the wiring BL[1] to the transistor Tr12 in the memory cell MC[2, 1] can be expressed by a formula shown below.

$$I_{MC[2,1],0} = k(V_{PR} - V_{W[2,1]} - V_{th})^2 \qquad (E3)$$

Furthermore, a current $I_{MCref[2], 0}$ flowing from the wiring BLref to the transistor Tr12 in the memory cell MCref[2] can be expressed by a formula shown below.

$$I_{MCref[2],0} = k(V_{PR} - V_{th})^2 \qquad (E4)$$

Next, in a period from Time T04 to Time T05, the potential of the wiring WL[2] becomes the low level. Consequently, the transistors Tr11 included in the memory cell MC[2, 1] and the memory cell MCref[2] are brought into off states, and the potentials of the node NM[2, 1] and the node NMref[2] are held.

Through the above operation, the first data is stored in the memory cells MC[1, 1] and MC[2, 1], and the reference data is stored in the memory cells MCref[1] and MCref[2].

Here, currents flowing through the wiring BL[1] and the wiring BLref in the period from Time T04 to Time T05 are considered. The current is supplied from the current source circuit CS to the wiring BLref. The current flowing through the wiring BLref is discharged to the current mirror circuit CM and the memory cells MCref[1] and MCref[2]. A formula shown below holds where $I_{Cref}$ is the current supplied from the current source circuit CS to the wiring BLref and $I_{CM, 0}$ is the current discharged from the wiring BLref to the current mirror circuit CM.

$$I_{Cref} - I_{CM,0} = I_{MCref[1],0} + I_{MCref[2],0} \qquad (E5)$$

The current from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds where $I_{C, 0}$ is the current supplied from the current source circuit CS to the wiring BL[1] and $I_{\alpha, 0}$ is the current flowing from the wiring BL[1] to the offset circuit OFST.

$$I_C - I_{CM,0} = I_{MC[1,1],0} + I_{MC[2,1],0} + I_{\alpha,0} \qquad (E6)$$

[Product-Sum Operation of First Data and Second Data]

Next, in a period from Time T05 to Time T06, the potential of the wiring RW[1] becomes a potential greater than the reference potential by $V_{X[1]}$. At this time, the potential $V_{X[1]}$ is supplied to the capacitor C11 in each of the memory cell MC[1, 1] and the memory cell MCref[1], so that the potential of the gate of the transistor Tr12 is increased because of capacitive coupling. Note that the potential $V_{X[1]}$ is a potential corresponding to the second data supplied to the memory cell MC[1, 1] and the memory cell MCref[1].

The amount of change in the potential of the gate of the transistor Tr12 corresponds to the value obtained by multiplying the amount of change in the potential of the wiring RW by a capacitive coupling coefficient determined by the memory cell structure. The capacitive coupling coefficient is calculated using the capacitance of the capacitor C11, the gate capacitance of the transistor Tr12, the parasitic capacitance, and the like. In the following description, for convenience, the amount of change in the potential of the wiring RW is equal to the amount of change in the potential of the gate of the transistor Tr12, that is, the capacitive coupling coefficient is set to 1. In practice, the potential $V_X$ can be determined in consideration of the capacitive coupling coefficient.

When the potential $V_{X[1]}$ is supplied to the capacitors C11 in the memory cell MC[1, 1] and the memory cell MCref[1], the potentials of the node NM[1, 1] and the node NMref[1] each increase by $V_{X[1]}$.

Here, a current $I_{MC[1, 1], 1}$ flowing from the wiring BL[1] to the transistor Tr12 in the memory cell MC[1, 1] in the period from Time T05 to Time T06 can be expressed by the following formula.

$$I_{MC[1,1],1} = k(V_{PR} - V_{W[1,1]} + V_{X[1]} - V_{th})^2 \qquad (E7)$$

Thus, when the potential $V_{X[1]}$ is supplied to the wiring RW[1], the current flowing from the wiring BL[1] to the transistor Tr12 in the memory cell MC[1, 1] increases by $\Delta I_{MC[1,\ 1]} = I_{MC[1,\ 1],\ 1} - I_{MC[1,\ 1],\ 0}$.

A current $I_{MCref[1],\ 1}$ flowing from the wiring BLref to the transistor Tr12 in the memory cell MCref[1] in the period from Time T05 to Time T06 can be expressed by the following formula.

$$I_{MCref[1],1} = k(V_{PR} + V_{X[1]} - V_{th})^2 \qquad (E8)$$

Thus, when the potential $V_{X[1]}$ is supplied to the wiring RW[1], the current flowing from the wiring BLref to the transistor Tr12 in the memory cell MCref[1] increases by $\Delta I_{MCref[1]} = I_{MCref[1],\ 1} - I_{MCref[1],\ 0}$.

Furthermore, currents flowing through the wiring BL[1] and the wiring BLref are considered. The current $I_{Cref}$ is supplied from the current source circuit CS to the wiring BLref. The current flowing through the wiring BLref is discharged to the current mirror circuit CM and the memory cells MCref[1] and MCref[2]. A formula shown below holds where $I_{CM,\ 1}$ is the current discharged from the wiring BLref to the current mirror circuit CM.

$$I_{Cref} - I_{CM,1} = I_{MCref[1],1} + I_{MCref[2],0} \qquad (E9)$$

The current $I_C$ from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds where $I_{\alpha,\ 1}$ is the current flowing from the wiring BL[1] to the offset circuit OFST.

$$I_C - I_{CM,1} = I_{MC[1,1],1} + I_{MC[2,1],1} + I_{\alpha,1} \qquad (E10)$$

In addition, from the formula (E1) to the formula (E10), a difference between the current $I_{\alpha,\ 0}$ and the current $I_{\alpha,\ 1}$ (differential current $\Delta I_\alpha$) can be expressed by a formula shown below.

$$\Delta I_\alpha = I_{\alpha,1} - I_{\alpha,0} = 2 \ kV_{W[1,1]}V_{X[1]} \qquad (E11)$$

Thus, the differential current $\Delta I_\alpha$ is a value corresponding to the product of the potentials $V_{W[1,\ 1]}$ and $V_{X[1]}$.

After that, in a period from Time T06 to Time T07, the potential of the wiring RW[1] becomes the reference potential, and the potentials of the node NM[1, 1] and the node NMref[1] become similar to those in the period from Time T04 to Time T05.

Next, in a period from Time T07 to Time T08, the potential of the wiring RW[1] becomes a potential greater than the reference potential by $V_{X[1]}$, and the potential of the wiring RW[2] becomes a potential greater than the reference potential by $V_{X[2]}$. Accordingly, the potential $V_{X[1]}$ is supplied to the capacitor C11 in each of the memory cell MC[1, 1] and the memory cell MCref[1], and the potentials of the node NM[1, 1] and the node NMref[1] each increase by $V_{X[1]}$ because of capacitive coupling. Furthermore, the potential $V_{X[2]}$ is supplied to the capacitor C11 in each of the memory cell MC[2, 1] and the memory cell MCref[2], and the potentials of the node NM[2, 1] and the node NMref[2] each increase by $V_{X[2]}$ because of capacitive coupling.

Here, a current $I_{MC[2,\ 1],\ 1}$ flowing from the wiring BL[1] to the transistor Tr12 in the memory cell MC[2, 1] in the period from Time T07 to Time T08 can be expressed by the following formula.

$$I_{MC[2,1],1} = k(V_{PR} - V_{W[2,1]} + V_{X[2]} - V_{th})^2 \qquad (E12)$$

Thus, when the potential $V_{X[2]}$ is supplied to the wiring RW[2], the current flowing from the wiring BL[1] to the transistor Tr12 in the memory cell MC[2, 1] increases by $\Delta I_{MC[2,\ 1]} = I_{MC[2,\ 1],\ 1} - I_{MC[2,\ 1],\ 0}$.

A current $I_{MCref[2],\ 1}$ flowing from the wiring BLref to the transistor Tr12 in the memory cell MCref[2] in the period from Time T07 to Time T08 can be expressed by the following formula.

$$I_{MCref[2],1} = k(V_{PR} + V_{X[2]} - V_{th})^2 \qquad (E13)$$

Thus, when the potential $V_{X[2]}$ is supplied to the wiring RW[2], the current flowing from the wiring BLref to the transistor Tr12 in the memory cell MCref[2] increases by $\Delta I_{MCref[2]} = I_{MCref[2],\ 1} - I_{MCref[2],\ 0}$.

Furthermore, currents flowing through the wiring BL[1] and the wiring BLref are considered. The current $I_{Cref}$ is supplied from the current source circuit CS to the wiring BLref. The current flowing through the wiring BLref is discharged to the current mirror circuit CM and the memory cells MCref[1] and MCref[2]. A formula shown below holds where $I_{CM,\ 2}$ is the current discharged from the wiring BLref to the current mirror circuit CM.

$$I_{Cref} - I_{CM,2} = I_{MCref[1],1} + I_{MCref[2],1} \qquad (E14)$$

The current $I_C$ from the current source circuit CS is supplied to the wiring BL[1]. The current flowing through the wiring BL[1] is discharged to the current mirror circuit CM and the memory cells MC[1, 1] and MC[2, 1]. Furthermore, the current flows from the wiring BL[1] to the offset circuit OFST. A formula shown below holds where $I_{\alpha,\ 2}$ is the current flowing from the wiring BL[1] to the offset circuit OFST.

$$I_C - I_{CM,2} = I_{MC[1,1],1} + I_{MC[2,1],1} + I_{\alpha,2} \qquad (E15)$$

In addition, from the formula (E1) to the formula (E8) and the formula (E12) to the formula (E15), a difference between the current $I_{\alpha,\ 0}$ and the current $I_{\alpha,\ 2}$ (differential current $\Delta I_\alpha$) can be expressed by the following formula.

$$\Delta I_\alpha = I_{\alpha,2} - I_{\alpha,0} = 2k(V_{W[1,1]}V_{X[1]} + V_{W[2,1]}V_{X[2]}) \qquad (E16)$$

Thus, the differential current $\Delta I_\alpha$ is a value corresponding to the sum of the product of the potential $V_{W[1,\ 1]}$ and the potential $V_{X[1]}$ and the product of the potential $V_{W[2,\ 1]}$ and the potential $V_{X[2]}$.

After that, in a period from Time T08 to Time T09, the potentials of the wirings RW[1] and RW[2] become the reference potential, and the potentials of the nodes NM[1, 1] and NM[2, 1] and the nodes NMref[1] and NMref[2] become similar to those in the period from Time T04 to Time T05.

As represented by the formula (E11) and the formula (E16), the differential current $\Delta I_\alpha$ input to the offset circuit OFST can be calculated from the formula including a product term of the potential $V_W$ corresponding to the first data (weight) and the potential $V_X$ corresponding to the second data (input data). Thus, measurement of the differential current $\Delta I_\alpha$ with the offset circuit OFST gives the result of the product-sum operation of the first data and the second data.

Note that although the memory cells MC[1, 1] and MC[2, 1] and the memory cells MCref[1] and MCref[2] are particularly focused on in the above description, the number of the memory cells MC and the memory cells MCref can be freely set. In the case where the number m of rows of the memory cells MC and the memory cells MCref is an arbitrary number i, the differential current $\Delta I_\alpha$ can be expressed by the following formula.

$$\Delta I_\alpha = 2k\Sigma_i V_{W[i,1]} V_{X[i]} \tag{E17}$$

When the number n of columns of the memory cells MC and the memory cells MCref is increased, the number of product-sum operations executed in parallel can be increased.

The product-sum operation of the first data and the second data can be performed using the semiconductor device MAC as described above. Note that the use of the structure of the memory cells MC and the memory cells MCref in FIG. 15 allows the product-sum operation circuit to be formed of fewer transistors. Accordingly, the circuit scale of the semiconductor device MAC can be reduced.

In the case where the semiconductor device MAC is used for the operation in the neural network, the number m of rows of the memory cells MC can correspond to the number of pieces of input data supplied to one neuron and the number n of columns of the memory cells MC can correspond to the number of neurons. For example, the case where a product-sum operation using the semiconductor device MAC is performed in the middle layer HL in FIG. 13A is considered. In this case, the number m of rows of the memory cells MC can be set to the number of pieces of input data supplied from the input layer IL (the number of neurons in the input layer IL), and the number n of columns of the memory cells MC can be set to the number of neurons in the middle layer HL.

Note that there is no particular limitation on the structure of the neural network for which the semiconductor device MAC is used. For example, the semiconductor device MAC can also be used for a convolutional neural network (CNN), a recurrent neural network (RNN), an autoencoder, a Boltzmann machine (including a restricted Boltzmann machine), and the like.

The product-sum operation of the neural network can be performed using the semiconductor device MAC as described above. Furthermore, the memory cells MC and the memory cells MCref shown in FIG. 15 are used for the cell array CA, which can provide an integrated circuit with improved calculation accuracy, lower power consumption, or a reduced circuit scale.

This embodiment can be combined with any of the other embodiments as appropriate.

(Notes on Description of this Specification and the Like)

The description of the above embodiments and each structure in the embodiments are noted below.

One embodiment of the present invention can be constituted by combining, as appropriate, the structure described in each embodiment with any of the structures described in the other embodiments and Example. In addition, in the case where a plurality of structure examples are described in one embodiment, the structure examples can be combined as appropriate.

Note that content (or part thereof) described in one embodiment can be applied to, combined with, or replaced with another content (or part thereof) described in the embodiment and/or content (or part thereof) described in another embodiment or other embodiments.

Note that in each embodiment, content described in the embodiment is content described using a variety of drawings or content described with text disclosed in the specification.

Note that by combining a drawing (or part thereof) described in one embodiment with another part of the drawing, a different drawing (or part thereof) described in the embodiment, and/or a drawing (or part thereof) described in another embodiment or other embodiments, much more drawings can be created.

In addition, in this specification and the like, components are classified on the basis of the functions, and shown as blocks independent of one another in block diagrams. However, in an actual circuit or the like, it is difficult to separate components on the basis of the functions, and there are such a case where one circuit is associated with a plurality of functions and a case where a plurality of circuits are associated with one function. Therefore, blocks in the block diagrams are not limited by the components described in the specification, and the description can be changed appropriately depending on the situation.

Furthermore, in the drawings, the size, the layer thickness, or the region is shown with given magnitude for description convenience. Therefore, they are not limited to the illustrated scale. Note that the drawings are schematically shown for clarity, and embodiments of the present invention are not limited to shapes, values, or the like shown in the drawings. For example, fluctuation in signal, voltage, or current due to noise, fluctuation in signal, voltage, or current due to difference in timing, or the like can be included.

Furthermore, the positional relation between components illustrated in the drawings and the like is relative. Therefore, when the components are described with reference to drawings, terms for describing the positional relation, such as "over" and "under", may be used for convenience. The positional relation of the components is not limited to that described in this specification and can be explained with other terms as appropriate depending on the situation.

In this specification and the like, expressions "one of a source and a drain" (or a first electrode or a first terminal) and "the other of the source and the drain" (or a second electrode or a second terminal) are used in the description of the connection relation of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

Furthermore, in this specification and the like, "voltage" and "potential" can be interchanged with each other as appropriate. The voltage refers to a potential difference from a reference potential, and when the reference potential is a ground voltage, for example, the voltage can be rephrased into the potential. The ground potential does not necessarily mean 0 V. Note that potentials are relative values, and a potential applied to a wiring or the like is sometimes changed depending on the reference potential.

In this specification and the like, a node can be referred to as a terminal, a wiring, an electrode, a conductive layer, a conductor, an impurity region, or the like depending on the circuit structure, the device structure, or the like. Furthermore, a terminal, a wiring, or the like can be referred to as a node.

In this specification and the like, the expression "A and B are connected" means the case where A and B are electrically connected. Here, the expression "A and B are electrically connected" means connection that enables electric signal transmission between A and B in the case where an object (that refers to an element such as a switch, a transistor element, or a diode, a circuit including the element and a wiring, or the like) exists between A and B. Note that the case where A and B are electrically connected includes the case where A and B are directly connected. Here, the expression "A and B are directly connected" means connection that enables electric signal transmission between A and B through a wiring (or an electrode) or the like, not through the above object. In other words, direct connection refers to connection that can be regarded as the same circuit diagram when indicated as an equivalent circuit.

In this specification and the like, a switch has a function of controlling whether current flows or not by being in a conduction state (an on state) or a non-conduction state (an off state). Alternatively, a switch has a function of selecting and changing a current path.

In this specification and the like, channel length refers to, for example, the distance between a source and a drain in a region where a semiconductor (or a portion where current flows in a semiconductor when a transistor is in an on state) and a gate overlap with each other or a region where a channel is formed in a top view of the transistor.

In this specification and the like, channel width refers to, for example, the length of a portion where a source and a drain face each other in a region where a semiconductor (or a portion where current flows in a semiconductor when a transistor is in an on state) and a gate electrode overlap with each other or a region where a channel is formed.

Note that in this specification and the like, the terms such as "film" and "layer" can be interchanged with each other depending on the case or according to circumstances. For example, the term "conductive layer" can be changed into the term "conductive film" in some cases. As another example, the term "insulating film" can be changed into the term "insulating layer" in some cases.

REFERENCE NUMERALS

C11: capacitor, C21: capacitor, R1: resistor, Tr11: transistor, Tr12: transistor, Tr21: transistor, Tr22: transistor, Tr23: transistor, 10: document search system, 20: input portion, 21: text data, 21TB: table data, 30: processing portion, 40: memory portion, 50: database, 51: reference document data, 52: weight dictionary data, 52TB: table data, 53: synonym search data, 53TB: table data, 53TB_re: table data, 60: output portion, 61: search data, 61TB: table data, 62: search data, 62TB: table data, 70: transmission path.

The invention claimed is:

1. A semiconductor device comprising:
a processing portion, the processing portion comprising:
    a processor comprising a transistor; and
    a memory portion in which a program is stored,
wherein the processor is configured to perform a document search comprising the steps of:
    generating weight dictionary data and thesaurus data on the basis of a plurality of pieces of reference document data stored in a database;
    generating text analysis data from text data;
    extracting a search word from words included in the text analysis data;
    generating first search data from the search word on the basis of the weight dictionary data and the thesaurus data;
    modifying the first search data to generate second search data by modifying a value of weight data of the first search data;
    storing the second search data in the memory portion;
    updating the thesaurus data by adding a product of a contribution ratio and a difference between the first search data and second search data after the second search data has been stored in the memory portion;
    generating ranking data by giving scores to the plurality of pieces of reference document data on the basis of the second search data and ranking the plurality of pieces of reference document data on the basis of the scores to the thesaurus data,
wherein reference text analysis data is generated from the plurality of pieces of reference document data,
wherein a plurality of keywords and related terms of the keywords are extracted from words included in the reference text analysis data,
wherein the value of weight data is modified in accordance with a degree of relevance of the related terms of the keywords by a user,
wherein the weight dictionary data is generated by extracting appearance frequencies of the keywords from the words included in the reference text analysis data and adding, to each of the plurality of keywords, a first weight based on the appearance frequency, and
wherein the first weight is a value based on an inverse document frequency of the keyword in the reference text analysis data.

2. The semiconductor device according to claim 1, wherein the thesaurus data is generated by adding a second weight to each of the related terms.

3. The semiconductor device according to claim 2, wherein the second weight is a product of the first weight of the keyword and a value based on a similarity degree or a distance between a distributed representation vector of the related term and a distributed representation vector of the keyword.

4. The semiconductor device according to claim 3, wherein the distributed representation vector is generated with use of a neural network.

5. The semiconductor device according to claim 1, wherein, in updating the thesaurus data, the second search data is modified by a plurality of users.

6. The semiconductor device according to claim 1, wherein the user modifies the value of the weight data using a display device.

7. A semiconductor device comprising:

a processing portion, the processing portion comprising:

a processor comprising a transistor; and a memory portion in which a program is stored, wherein the processor is configured to perform a document search comprising the steps of:

generating weight dictionary data and thesaurus data on the basis of a plurality of pieces of reference document data stored in a database;

generating text analysis data from text data;

extracting a search word from words included in the text analysis data;

generating first search data from the search word on the basis of the weight dictionary data and the thesaurus data;

modifying the first search data to generate second search data by modifying a value of weight data of the first search data;

storing the second search data in the memory portion;

updating the thesaurus data by adding a product of a contribution ratio and a difference between the first search data and second search data after the second search data has been stored in the memory portion;

generating ranking data by giving scores to the plurality of pieces of reference document data on the basis of the second search data and ranking the plurality of pieces of reference document data on the basis of the scores to the thesaurus data, wherein the value of weight data is modified in accordance with a degree of relevance of related terms of a keyword by a user.

8. The semiconductor device according to claim 7, wherein the related terms are generated by adding a weight based on a similarity degree to terms related to the keyword, and wherein the related terms include synonyms, antonyms, broader terms, and narrower terms of the keyword.

9. The semiconductor device according to claim 7, wherein the user modifies the value of the weight data using a display device.

* * * * *